US011423266B2

(12) United States Patent
Lee et al.

(10) Patent No.: US 11,423,266 B2
(45) Date of Patent: *Aug. 23, 2022

(54) SUBJECT RECOGNIZING METHOD AND APPARATUS

(71) Applicant: Samsung Electronics Co., Ltd., Suwon-si (KR)

(72) Inventors: Huijin Lee, Pohang-si (KR); Minsu Ahn, Yongin-si (KR); Sunghoon Hong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/903,702

(22) Filed: Jun. 17, 2020

(65) Prior Publication Data

US 2020/0311488 A1     Oct. 1, 2020

Related U.S. Application Data

(63) Continuation of application No. 15/886,100, filed on Feb. 1, 2018, now Pat. No. 10,726,309.

(30) Foreign Application Priority Data

Aug. 14, 2017   (KR) .......................... 10-2017-0103028

(51) Int. Cl.
*G06K 9/00* (2022.01)
*G06T 15/00* (2011.01)
(Continued)

(52) U.S. Cl.
CPC .......... *G06K 9/6282* (2013.01); *G06K 9/6219* (2013.01); *G06T 7/248* (2017.01);
(Continued)

(58) Field of Classification Search
USPC ....... 382/100, 103, 106–107, 154, 162, 168, 382/172–173, 181, 199, 209, 219, 224,
(Continued)

(56) References Cited

U.S. PATENT DOCUMENTS 9,330,471 B2 *  5/2016  Venkatraman .......... G01C 21/12
2009/0024251 A1 *  1/2009  Myeong ............... G05D 1/0274
                                                        901/1
(Continued)

FOREIGN PATENT DOCUMENTS

JP      2009-70314 A      4/2009
JP      2014-3520 A       1/2014
(Continued)

OTHER PUBLICATIONS

Bay, Herbert et al., "Surf: Speeded up Robust Features." *European conference on computer vision*. Springer, Berlin, Heidelberg, 2006 (14 pages in English).

(Continued)

*Primary Examiner* — Seyed H Azarian
(74) *Attorney, Agent, or Firm* — NSIP Law

(57) ABSTRACT

Disclosed is a subject recognizing apparatus and method. The method may include extracting feature points from a target image, respectively measuring movement information of each of a plurality of the extracted feature points, selectively grouping the extracted feature points into one or more groups based on the respectively measured movement information, determining a type of subject present in at least one group of the one or more groups based on at least a portion of the subject present in the at least one group, and recognizing a subject included in the target image based on the determined type of subject.

31 Claims, 11 Drawing Sheets

(51) Int. Cl.
*G06K 9/62* (2022.01)
*G06T 7/246* (2017.01)
*G06V 10/10* (2022.01)
*G06V 10/40* (2022.01)
*G06V 10/147* (2022.01)
*G06V 10/46* (2022.01)
*G06V 10/75* (2022.01)
*G06V 20/10* (2022.01)

(52) U.S. Cl.
CPC ............ *G06V 10/10* (2022.01); *G06V 10/147* (2022.01); *G06V 10/40* (2022.01); *G06V 10/462* (2022.01); *G06V 10/751* (2022.01); *G06V 10/757* (2022.01); *G06V 20/10* (2022.01); *G06T 2207/10012* (2013.01); *G06V 2201/07* (2022.01)

(58) Field of Classification Search
USPC ....... 382/232, 254, 274, 276, 285–291, 305, 382/312, 115, 159; 725/116; 348/94, 348/169; 700/259; 901/1; 345/419
See application file for complete search history.

(56) References Cited

U.S. PATENT DOCUMENTS

| | | | |
|---|---|---|---|
| 2011/0080336 A1 | 4/2011 | Leyvand et al. | |
| 2013/0046793 A1 | 2/2013 | Reznik et al. | |
| 2014/0016830 A1* | 1/2014 | Wang | G06V 40/10 382/159 |
| 2014/0226864 A1* | 8/2014 | Venkatraman | G01C 21/12 382/107 |
| 2014/0254923 A1* | 9/2014 | Vidal Calleja | G06F 16/5838 382/159 |
| 2016/0005229 A1* | 1/2016 | Lee | G06T 11/60 345/419 |
| 2016/0007058 A1* | 1/2016 | Wang | H04N 21/4122 725/116 |
| 2017/0039686 A1 | 2/2017 | Miura et al. | |

FOREIGN PATENT DOCUMENTS

| | | |
|---|---|---|
| JP | 2016-194779 A | 11/2016 |
| JP | 2017-73039 A | 4/2017 |
| KR | 10-2012-0044245 A | 5/2012 |
| KR | 10-2012-0095445 A | 8/2012 |
| KR | 10-2013-0128097 A | 11/2013 |
| KR | 10-2014-0067604 A | 6/2014 |

OTHER PUBLICATIONS

Lowe, David G. "Distinctive Image Features from Scale-Invariant Keypoints." *International journal of computer vision* 60.2, 2004 (pp. 91-110).

Nister, David, et al. "Scalable Recognition with a Vocabulary Tree", Proceedings of the *IEEE Computer Society Conference on Computer Vision and Pattern Recognition*, vol. 2, 2006, (pp. 2161-2168).

Rosten, Edward, et al., "Machine learning for high-speed corner detection." *European conference on computer vision*. Springer, Berlin, Heidelberg, 2006 (14 pages in English).

Rublee, Ethan, et al. "ORB: An efficient alternative to SIFT or SURF." *2011 International Conference on Computer Vision*, 2011 (pp. 2564-2571).

Calonder, Michael, et al. "Brief: Binary Robust Independent Elementary Features." *European conference on computer vision*. Springer, Berlin, Heidelberg, 2010 (14 pages in English).

Gálvez-López, Dorian, et al., "Bags of Binary Words for Fast Place Recognition in Image Sequences", *IEEE Transactions on Robotics*, vol. 28, No. 5, Oct. 2012, (pp. 1188-1197).

Mur-Artal, Raul et al., "ORB-SLAM: A Versatile and Accurate Monocular SLAM System." *IEEE Transactions on Robotics*, vol. 31, Issue 5, Oct. 2015 (pp. 1147-1163).

Rodriguez, Alex, et al., "Clustering by fast search-and-find of density peaks", *Science*, vol. 344, No. 6191, Jun. 2014, (pp. 1492-1496).

"Bag of Words Technique," http://darkpgmr.tistory.com/125, date of publication Feb. 19, 2014, PDF capture dated Jan. 31, 2017 (14 pages in Korean).

Korean Office Action dated Mar. 7, 2022, in counterpart Korean Patent Application No. 10-2017-0103028 (2 pages in English and 5 pages in Korean).

* cited by examiner

FIG. 10
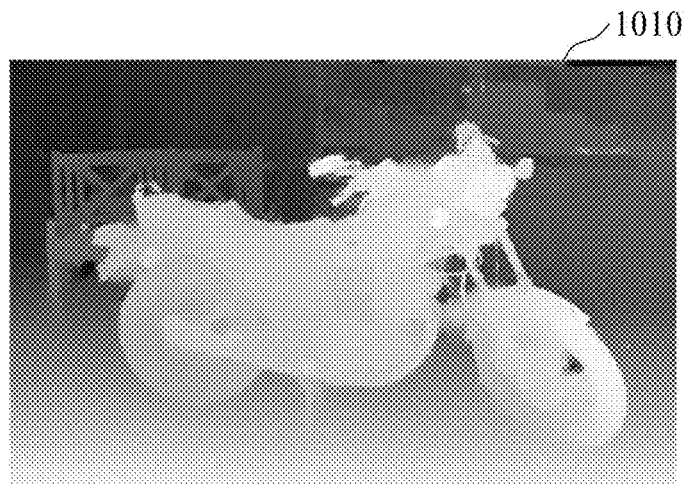
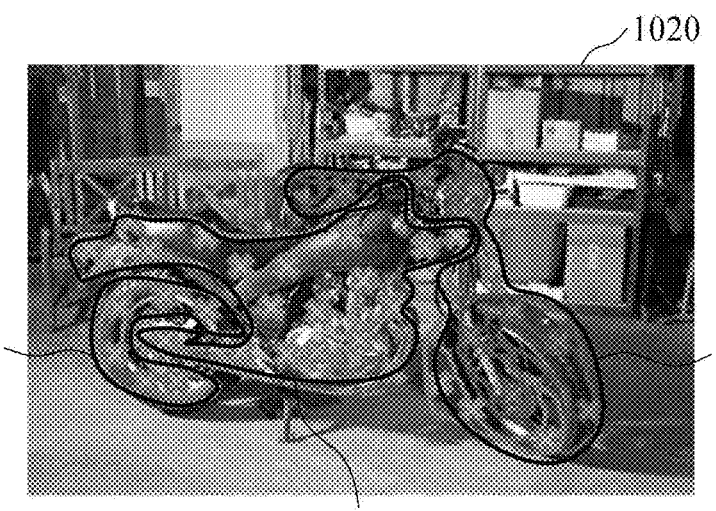
Group 1021
Group 1022
Group 1023
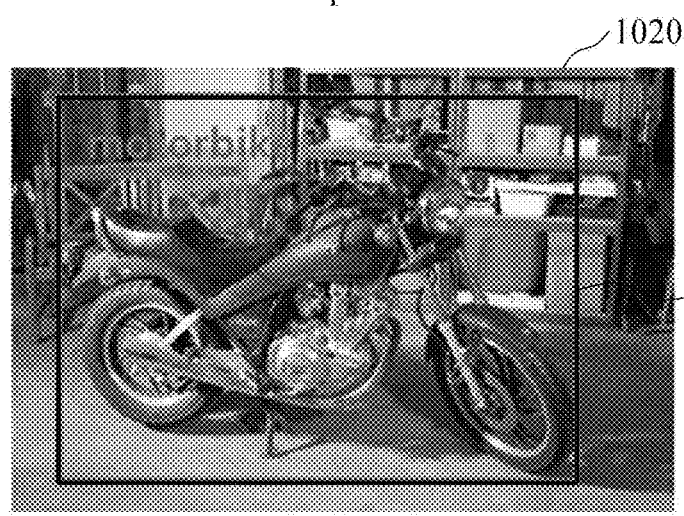
1031

SUBJECT RECOGNIZING METHOD AND APPARATUS

CROSS-REFERENCE TO RELATED APPLICATIONS

This application is a continuation of U.S. application Ser. No. 15/886,100 filed on Feb. 1, 2018, which claims the benefit under 35 USC § 119(a) of Korean Patent Application No. 10-2017-0103028 filed on Aug. 14, 2017 in the Korean Intellectual Property Office, the entire disclosures of which are incorporated herein by reference for all purposes.

BACKGROUND

1. Field

The following description relates to a subject recognizing method and apparatus.

2. Description of Related Art

Various technological approaches for verifying whether a target image corresponds to a key frame of an object registered in advance in a database may be used to recognize a subject included in the target image.

However, when a subject included in the target image is occluded due to, for example, an occlusion of one subject over another subject, such verification approaches may not recognize the occluded subject or may falsely recognize the subject. In addition, such approaches may less accurately respectively recognize multiple subjects included in a target image than when a single subject is included in the target image. Also, consideration of a great number of key frames is typically required for accurate subject recognition in such approaches, but such a consideration of such a great number of key frames may be difficult to implement in a mobile device implementation because the corresponding volume of data considered increases as the number of key frames increases. Thus, there are technological problems in such typical technological approaches.

SUMMARY

This Summary is provided to introduce a selection of concepts in a simplified form that are further described below in the Detailed Description. This Summary is not intended to identify key features or essential features of the claimed subject matter, nor is the Summary intended to be used as an aid in determining the scope of the claimed subject matter.

In one general aspect, a processor-implemented subject recognizing method includes extracting feature points from a target image, respectively measuring movement information of each of a plurality of the extracted feature points, selectively grouping the extracted feature points into one or more groups based on the respectively measured movement information, determining a type of subject present in at least one group of the one or more groups based on at least a portion of the subject present in the at least one group, and recognizing a subject included in the target image based on the determined type of subject.

The respective measuring of the movement information may include measuring a temporal movement and/or a spatial movement of each of the plurality of extracted feature points.

The recognizing of the subject included in the target image may be based on a non-occluded portion of the subject, without consideration of an occluded portion of the subject not present in the target image, based on the determined type of subject.

The determining the type of the subject present in the at least one group of the one or more groups may include determining a feature point descriptor for a feature point, of the plural extracted feature points, included in the one group and hierarchically spreading the feature point descriptor from a root node to a leaf node of an image vocabulary tree to determine a most similar class of plural classes of the image vocabulary tree, the most similar class being indicative of a corresponding type of subject present in the one group.

The determining of the type of the subject present in the at least one group of the one or more groups may include determining respective types of subjects in each of two or more groups, including comparing each of the two or more groups to classes in which source images of objects including the subject are preclassified, and the recognizing of the subject may include determining whether any of the two or more groups include an identical type among the determined respective types of subjects, and combining select groups in which the identical type is determined based on corresponding measured movement information of the respectively measured movement information.

The classes may be preclassified in an image vocabulary database structure in a hierarchical classification of the source images of the objects in a feature space determined based on elements of feature point descriptors indicating features of pixels associated with feature points in the source images.

The method may further include performing the preclassifying by performing the hierarchical classifying of the source images, with the image vocabulary database structure being an image vocabulary tree.

The method may further include extracting, from the one or more groups, a group in which a corresponding type of subject is indeterminable.

The combining may include selectively combining the select groups, the selective combining being dependent on a determination, based on the corresponding measured movement information, of which of a single subject and different subjects the select groups correspond to.

The combining may further include calculating the corresponding movement information by calculating movement information of each of the select groups by respectively combining pieces of movement information of feature points for each of the select groups, and the determination of which of the single subject and the different subjects the select groups correspond to may be based on results of comparing the respectively combined pieces of the movement information.

The respective measuring of the movement information of each of the plural extracted feature points may include determining temporal movement information indicating a respective temporal movement of each of the plural extracted feature points based on a reference image captured before or after a point in time at which the target image is captured.

The respective measuring of the movement information of each of the plural extracted feature points may include determining spatial movement information indicating a respective spatial movement of each of the plural extracted feature points based on depth information indicating a determined depth for each of the plural extracted feature points from a camera based on comparisons of the target image and a parallax image corresponding to the target image and captured at a same time as the target image by the camera.

The camera may be a stereo camera including at least two image sensors separated by a preset distance, at least one of the two image sensors capturing the target image and the two image sensors being used to generate the parallax image.

In one general aspect, provided is a non-transitory computer readable medium including instructions, which when executed by a processor, cause the processor to implement one or more or any combination of operations and methods described herein.

In one general aspect, a processor-implemented subject recognizing method includes extracting feature points from a target image, grouping the extracted feature points to generate plural groups of the extracted feature points, determining respective types of subjects included in each of the plural groups, including determining whether two or more groups of the plural groups that have determined identical types of subject include at least respective portions of a same subject, and recognizing a subject included in the target image based on the determined respective types of subjects.

The generating of the plural groups may include generating the plural groups based on respectively determined similarities between the extracted feature points, the respective determination of the similarities being determined by comparing respective coordinates of the extracted feature points and determined movement information of the extracted feature points determined by comparing the target image to a reference image captured before the target image is captured.

The determining of the respective types of subjects may include determining a type of subject present in each of the plural groups by comparing each of the plural groups to classes in which source images of objects are preclassified in hierarchical classification of the source images of the objects in a feature space determined based on elements of feature point descriptors indicating features of pixels associated with feature points in the source images.

The method may further include extracting, from the plural groups, a group in which a corresponding type of subject is indeterminable.

The determining of the respective types of the subjects included in each of the plural groups may include determining respective movement information indicating movements of each of the plural groups between the target image and a reference image captured before the target image is captured, and determining whether the two or more groups of the plural groups have the identical types of the subject by determining whether the two or more groups include different portions of a same subject dependent on a difference between pieces of corresponding movement information, of the determined respective movement information, of the two or more groups being less than or equal to a preset threshold value.

The method may further include combining the two or more groups in response to the determining of whether the two or more groups include the different portions of the same subject determining that the two or more groups include the different portions of the same subject.

In one general aspect, a subject recognizing apparatus includes a processor configured to extract feature points from a target image, respectively measure movement information of each of a plurality of the extracted feature points, selectively group the extracted feature points into one or more groups based on the respectively measured movement information, determine a type of subject present in at least one group of the one or more groups based on at least a portion of the subject present in the at least one group, and recognize a subject included in the target image based on the determined type of subject.

The apparatus may further include a memory configured to store the target image received from a camera.

The apparatus may further include a non-transitory memory storing instructions, which when executed by the processor, cause the processor to implement the extracting of the feature points, the respective measuring of the movement information of each of the plural extracted feature points, the selective grouping of the extracted feature points into one or more groups, the determining of the type of the subject present in the at least one group of the one or more groups, and the recognizing of the subject included in the target image.

To perform the determining of the type of the subject present in the at least one group of the one or more groups, the processor may be configured to determine a feature point descriptor for a feature point, of the plural extracted feature points, included in the one group, and hierarchically spread the feature point descriptor from a root node to a leaf node of an image vocabulary tree to determine a most similar class of plural classes of the image vocabulary tree, the most similar class being indicative of a corresponding type of subject present in the one group.

To perform the determining of the type of subject present in the at least one group, the processor may be configured to determine respective types of subjects included in each of two or more groups of the one or more groups, and, to perform the recognizing of the subject, the processor may be configured to determine whether any of the two or more groups include an identical type among the determined respective types of subjects, and selectively combine select groups in which the identical type is determined based on corresponding measured movement information of the respectively measured movement information.

To perform the selective combining, the processor may selectively combine the select groups dependent on a determination, based on the corresponding measured movement information, of which of a single subject and different subjects the select groups correspond to.

To perform the determination of which of the single subject and the different subjects the select groups correspond to, the processor may be configured to calculate the corresponding movement information by calculating movement information of each of the select groups, and perform the determination of which of the single subject and the different subjects the select groups correspond to based on results of a comparing of a difference between pieces of the calculated movement information of each of the select groups to a preset threshold value.

The apparatus may further include a source image database configured to store source images of objects, wherein the processor may be configured to generate classes generated by hierarchically classifying the source images in a feature space determined based on elements of the feature points, and, to determine the type of the subject present in the at least one group, the processor may be configured to determine respective types of subject present in each of the one or more groups based on a class matched to each of the one or more groups among the generated classes.

The apparatus may further be configured to extract, from the one or more groups, a group in which a corresponding type of subject is indeterminable because the stored source images of objects, used to generate the classes, do not include the subject.

The apparatus may further include a camera configured to capture the target image.

Other features and aspects will be apparent from the following detailed description, the drawings, and the claims.

BRIEF DESCRIPTION OF THE DRAWINGS

FIG. 10 is a flowchart illustrating an example of a subject recognizing method for recognizing a subject of a target image based on movement.

Figure 1:
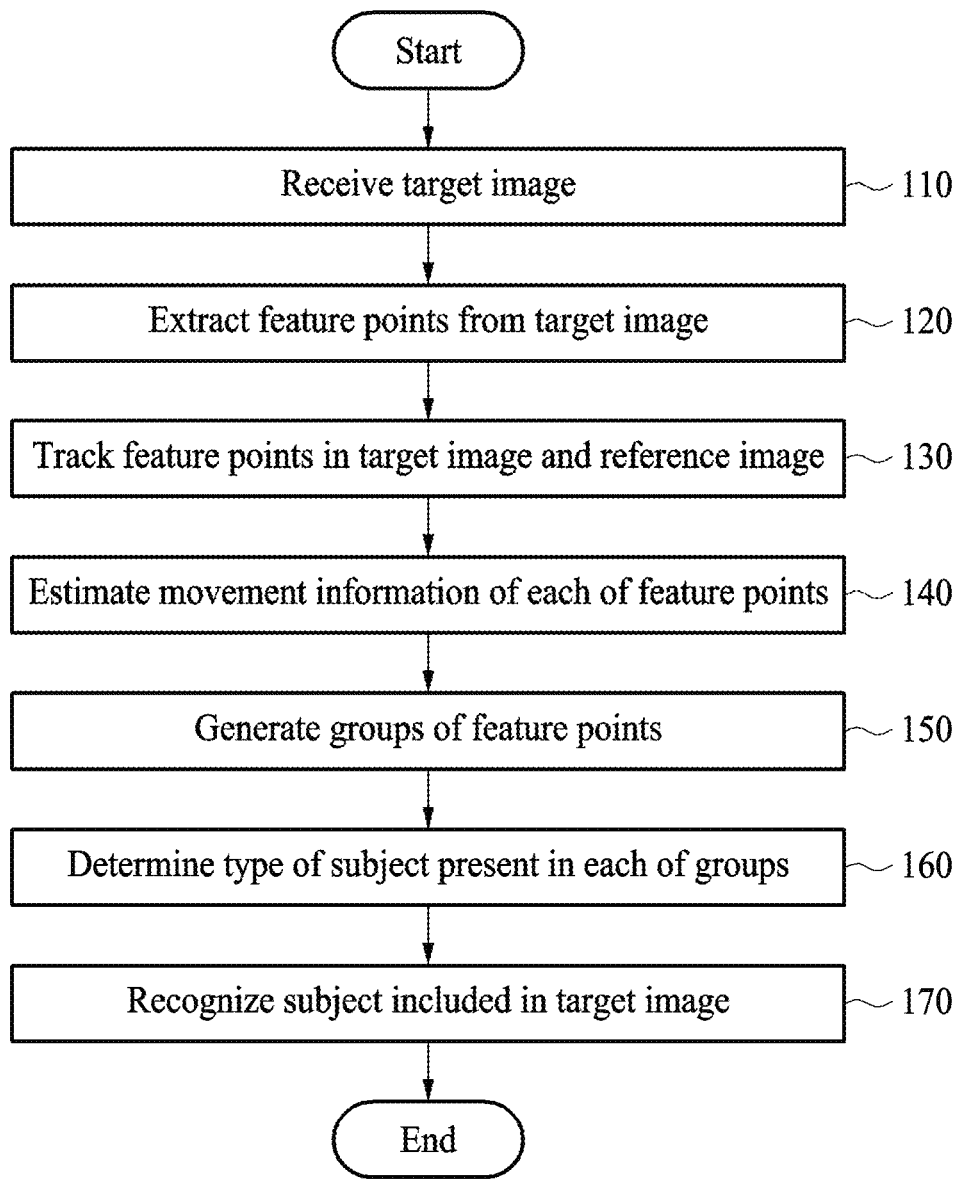
FIG. 1 is a flowchart illustrating an example of a subject recognizing method.

Throughout the drawings and the detailed description, unless otherwise described or provided, the same drawing reference numerals will be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. The sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The following structural or functional descriptions are provided merely to describe the examples, and the scope of the examples is not limited to the descriptions provided in the present specification. Various changes and modifications can be made thereto after an understanding of the disclosure of the present application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to concepts of the present disclosure.

As used herein, singular forms are intended to include the plural forms as well, unless the context clearly indicates otherwise. It should be further understood that the terms "comprises" and/or "comprising," when used in this specification, specify the presence of stated features, integers, operations, elements, components or a combination thereof, but do not preclude the presence or addition of one or more other features, integers, operations, elements, components, and/or combinations or groups thereof in alternate embodiments. In addition, further alternative embodiments that lack such stated features, integers, operations, elements, components, and/or combinations or groups thereof exist unless the context and understanding of the present disclosure indicates otherwise. In addition, the use of the term 'may' herein with respect to an example or embodiment, e.g., as to what an example or embodiment may include or implement, means that at least one example or embodiment exists where such a feature is included or implemented while all examples and embodiments are not limited thereto.

Unless otherwise defined herein, all terms used herein including technical or scientific terms have the same meanings as those generally understood by one of ordinary skill in the art after an understanding of the present disclosure. Terms defined in dictionaries generally used should be construed to have meanings matching with contextual meanings in the related art and the present disclosure and are not to be construed as an ideal or excessively formal meaning unless otherwise defined herein.

The examples herein may be implemented as, representative of, and included in, various types of products, for example, personal computers, laptop computers, tablet computers, smartphones, televisions, smart home appliances, intelligent vehicles, kiosks, and wearable devices, as non-limiting examples. As further examples, examples herein are implemented as and applicable to user authentication as/by a smartphone, a mobile device, and a smart home system, as non-limiting examples. The examples herein may include and be applied to payment service through user authentication, for example. In addition, the examples herein may also be implemented as and applied to, for example, an intelligent vehicle system that automatically starts a vehicle through user authentication, as another non-limiting example.

FIG. 1 is a flowchart illustrating an example of a subject recognizing method for recognizing a subject included in a target image. Referring to FIG. 1, a subject recognizing apparatus, for example, may detect a region in which one or more subjects are present from the target image and recognize the one or more subjects. Though the subject recognizing method is explained here through reference to the subject recognizing apparatus, which may correspond to any one or any combination of the respective subject recognizing apparatuses of FIGS. 2 through 10 and the subject recognizing apparatus 1110 of FIG. 11, examples are not limited thereto.

In operation 110, the example subject recognizing apparatus receives a target image captured at a point in time t. The subject recognizing apparatus may include or be connected to an image sensor or a camera that captures a neighboring space. The camera (or image sensor) may be controlled by the subject recognizing apparatus or a user. The camera (or image sensor) may output the target image by capturing the space, e.g., the space including at least one subject.

Further, the camera may output a plurality of temporally consecutive images by performing capturing at a preset time interval, for example, in intervals of milliseconds or seconds, as only examples. In response to the subject recognizing apparatus receiving a plurality of images that are consecutively captured at a preset time interval, the subject recognizing apparatus may consecutively recognize a subject present in one or more or each of the received images based on a time sequence in which the images are captured with respect to each of the images. In this case, the target image among the images indicates an image in which one or more subjects are to be recognized by the subject recognizing apparatus. A reference image indicates other images excluding the target image among the received images, that is, images captured before and/or after a point in time at which the target image is captured.

In operation 120, the subject recognizing apparatus extracts one or more of the feature points from the received target image. The target image includes a plurality of pixels, and each pixel may include information on an intensity and/or a color of a position of a pixel on an image sensor of the camera at the point in time at which the target image is captured. As a non-limiting examples, a feature point corresponds to or indicates a pixel that is determined to be easily classified when compared to other pixels, a pixel that is determined to be easily detectable, or a pixel that is determined to be easily specified. A feature point may correspond to, for example, an edge or a corner point, that is, a pixel that may be used to easily detect or recognize the subject present in a target image or that may be used to easily differentiate the subject from other subjects.

The subject recognizing apparatus may extract a feature point based on any one and any combination of any two or more of a Scale Invariant Feature Transform (SIFT) method, a Speeded Up Robust Features (SURF) method, a Binary Robust Independent Elementary Features (BRIEF) method, and, related to a Features from Accelerated Segment Test (FAST), an Oriented FAST and Rotated BRIEF (ORB) method, or any respective derivatives thereof, as non-limiting examples. Further, the subject recognizing apparatus may acquire each of feature points or a feature point descriptor including information associated with a feature of a neighboring pixel of each of the feature points. For example, the subject recognizing apparatus may acquire an ORB binary descriptor, as a non-limiting example, as the feature point descriptor corresponding to each of the feature points. The feature point descriptor is referred to as a feature vector or a visual word corresponding to each of the feature points, as non-limiting examples.

In operation 130, the subject recognizing apparatus tracks the feature points in the target image and a reference image. As described above, the feature point may be determined as a pixel that is determined to be easily tracked when compared to other pixels, among a plurality of pixels included in the target image. That is, in response to the subject recognizing apparatus receiving a plurality of images consecutively captured at the preset time interval, the subject recognizing apparatus may detect a temporal movement of each of the feature points by comparing an image (target image) acquired at a predetermined point in time to an image (reference image) acquired at another point in time. Here, the target image acquired at the predetermined point in time is thus a target on which an operation of recognizing the subject is to be performed.

In operation 140, the subject recognizing apparatus estimates/measures movement information of each of the feature points based on the respective temporal movements of each of the tracked feature points. The movement information includes any one and any combination of any two or more of coordinates of a feature point on a target image, coordinates of a feature point on a reference image, and a difference between the coordinates of the feature point on the target image and the coordinates of the feature point on the reference image. In more detail, the subject recognizing apparatus may determine a movement vector of each of the feature points by combining coordinates of the feature points on the target image and information of the movement of each of the detected feature points. Example operations by which a/the subject recognizing apparatus may determine the movement vector are described in greater detail below with reference to FIG. 2.

In operation 150, the subject recognizing apparatus generates groups of the feature points based on the measured movement information. The subject recognizing apparatus may generate one or more groups of the feature points by comparing pieces of movement information of respective feature points and grouping feature points having similar temporal movements. That is, determined similarly moving feature points in the reference image and the target image may be included in a single group. The subject recognizing apparatus may determine movement similarities between the feature points by comparing the pieces of movement information of the respective feature points and generating one or more groups of the feature points based on the determined movement similarities. Thus, the feature points corresponding to each of a plurality of overlapping subjects may be grouped to different groups because the groups are generated by grouping the feature points having similar temporal movements, even when the subjects present in the target image overlap each other. Example operations by which a/the subject recognizing apparatus may generate groups of feature points are described in greater detail below with reference to FIG. 2.

In operation 160, the subject recognizing apparatus determines a type of subject present in each of the generated groups. To determine the type of subject, from among plural types of subjects, the subject recognizing apparatus may generate, in advance, classes generated by clustering source images of various objects including the subject in a feature space determined based on elements of feature point descriptors. The classes may correspond to one or more respective nodes of a pre-trained image vocabulary tree. The subject recognizing apparatus may identify a class that is the most identical to feature points included in a group by comparing the classes to the feature points included in the group in the feature space. The subject recognizing apparatus may determine the type of subject present in the group based on the identified class.

That is, the subject recognizing apparatus may recognize the subject present in at least a portion of the target image including the group. Because the feature points corresponding to each of overlapping subjects are grouped to different groups and the type of subject is determined for each of the groups, the subject recognizing apparatus may easily classify the respective overlapping subjects.

In operation 170, the subject recognizing apparatus recognizes the subject included in the target image based on at least a portion of the subject present in each of the groups. As described above, the groups may not include all feature points associated with the subject because the groups are generated by grouping groups having similar temporal movements. In this case, at least a portion of the subject may be present in a region of the target image including a group. The subject recognizing apparatus may determine the movement information of each of the groups based on an average of the pieces of movement information of the respective feature points included in the groups. The subject recognizing apparatus may recognize a single or same subject present in the target image by comparing the pieces of movement information of the respective groups and combining the groups having similar temporal movements. Thus, the subject recognizing apparatus may more accurately recognize the subject even when the subjects are occluded or overlap each other, e.g., compared to typical technological approaches. Example operations by which a/the subject recognizing apparatus may recognize the subject included in the target image based on at least a portion of the subject present in each of groups are described in greater detail below with references to FIGS. 6 and 7.

Figure 2:
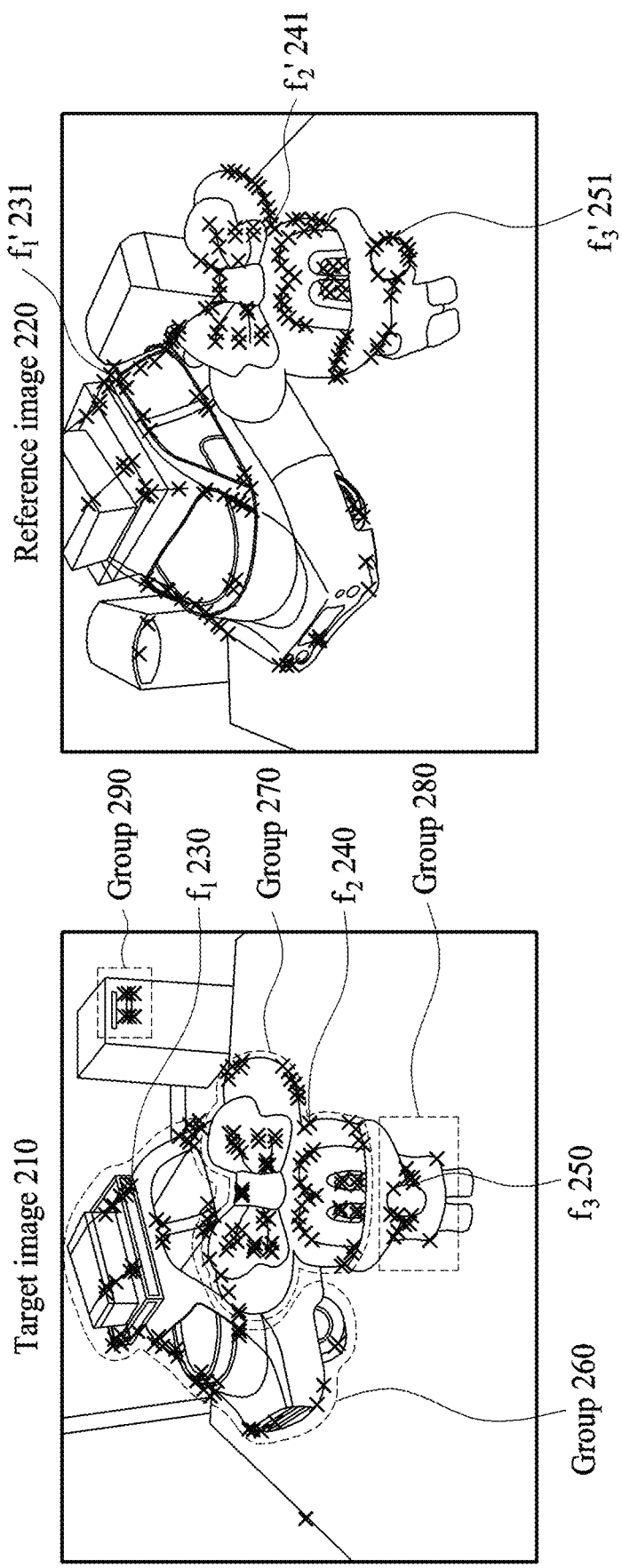
FIG. 2 illustrates an example of a subject recognizing method for generating groups of feature points based on movement information of each of the feature points.

FIG. 2 illustrates an example of a subject recognizing method for generating groups of feature points based on movement information of each of the feature points. Below, though the subject recognizing method of FIG. 2 is explained through references to a subject recognizing apparatus, which may correspond to any one or any combination of the respective subject recognizing apparatuses of FIG. 1, FIGS. 3 through 10, and the subject recognizing apparatus 1110 of FIG. 11, examples are not limited thereto.

FIG. 2 illustrates a target image 210 in which a subject is recognized by the example subject recognizing apparatus and a reference image 220 used by the subject recognizing apparatus to recognize the subject of the target image 210. Respective feature points extracted from the target image 210 by the subject recognizing apparatus are each indicated by a corresponding illustrated X. As illustrated in FIG. 2, the subject recognizing apparatus may extract a plurality of feature points including feature points $f_1$ 230, $f_2$ 240, and $f_3$ 250 from the target image 210. Coordinates of the feature point $f_1$ 230 on the target image 210 corresponds to (x1, y1), coordinates of the feature point $f_2$ 240 on the target image 210 corresponds to (x2, y2), and coordinates of the feature point $f_3$ 250 on the target image 210 corresponds to (x3, y3).

The subject recognizing apparatus may track movements of respective feature points in the target image 210 and the reference image 220. As described above, the reference image 220 can track temporal movements of feature points because the example reference image 220 is captured before or after the target image 210 is captured. For explanatory purposes, further references to the reference image 220 will be with respect to the example where the reference image 220 is captured before or temporally previous to when the target image 210 is captured. The subject recognizing apparatus may search for pixels corresponding to respective feature points of the target image 210 in the reference image 220.

For example, the subject recognizing apparatus may search for a pixel $f_1$' 231 of the reference image 220 corresponding to the feature point $f_1$ 230 of the target image 210. Similarly, the subject recognizing apparatus may search for a pixel $f_2$' 241 of the reference image 220 corresponding to the feature point $f_2$ 240 of the target image 210, and a pixel $f_3$' 251 of the reference image 220 corresponding to the feature point $f_3$ 250 of the target image 210. The subject recognizing apparatus may perform any one and any combination of any two or more of a SIFT method, a SURF method, a BRIEF method, an ORB method, and any respective derivatives thereof, as non-limiting examples, in order to perform the searching for the pixels (or feature points) of reference image 220 corresponding to the feature points of the target image 210.

The subject recognizing apparatus may determine movement information of each of the feature points based on coordinates of the feature points on the target image 210 and found coordinates of pixels of the reference image 220 of the pixels corresponding to the feature points. For example, when coordinates of the pixel $f_1$' 231 of the reference image 220 corresponds to ($x_1$', $y_1$'), movement information of the feature point $f_1$ 230 may be determined based on the coordinates ($x_1$,$y_1$) of the feature point $f_1$ 230 or coordinates ($x_1$', $y_1$') of the pixel $f_1$' 231. In more detail, the subject recognizing apparatus may determine, as the movement information of the feature point $f_1$ 230, a movement vector $v_1$=($x_1$, $y_1$, $dx_1$, $dy_1$) acquired by combining the coordinates ($x_1$, $y_1$) of the feature point $f_1$ 230 and a change (dx) amount of coordinates ($dx_1$, $dy_1$)=($x_1$-$x_1$', $y_1$-$y_1$') of the feature point $f_1$ 230 and the pixel $f_1$' 231. Similarly, when coordinates of the pixel $f_2$' 241 and the pixel $f_3$' 251 of the reference image are ($x_2$', $y_2$') and ($x_3$', $y_3$'), respectively, movement vectors $v_1$, $v_2$, and $v_3$ of the feature points $f_1$ 230, $f_2$ 240, and $f_3$ 250 may be respectively determined as expressed in the below Equation 1, for example.

$$v_1=(x_1,y_1,dx_1,dy_1)=(x_1,y_1,x_1-x_1',y_1-y_1')$$

$$v_2=(x_2,y_2,dx_2,dy_2)=(x_2,y_2,x_2-x_2',y_2-y_2')$$

$$v_3=(x_3,y_3,dx_3,dy_3)=(x_3,y_3,x_3-x_3',y_3-y_3') \quad \text{Equation 1}$$

In the example of FIG. 2, based on a comparison between the target image 210 and the reference image 220, a difference between coordinates of the feature point $f_3$ 250 and the coordinates of the pixel $f_3$' 251 are determined to be greater than a difference between the coordinates of the feature point $f_1$ 230 and the pixel $f_1$' 231. Thus, based on such respective relative difference determinations, in the example of FIG. 2, a relationship of ($dx_1$, $dy_1$)<($dx_2$, $dy_2$)<($dx_3$, $dy_3$) may be determined/formed with respect to the feature points $f_1$ 230, $f_2$ 240, and $f_3$ 250.

Feature points of an identical subject may move similarly in the target image 210 and the reference image 220. That is, feature points of such an identical subject may have similar pieces of movement information. Referring to FIG. 2, with respect to the illustrated model car and the illustrated mouse doll in the target image 210, feature points of the model car including the feature point $f_1$ 230 may have similar pieces of movement information. However, the movement information of the feature points of the model car may differ from movement information of feature points of the mouse doll including the feature points $f_2$ 240 and $f_3$ 250.

The subject recognizing apparatus may thus generate groups of/for the feature points by separately grouping feature points having similar movements by comparing the respective pieces of movement information of the feature points. For example, the subject recognizing apparatus may determine whether example feature points fi and fj have similar movements based on an applied similarity determination of the below Equation 2, for example, dependent on determined movement vectors vi and vj corresponding to the respective feature points fi and fj.

$$\text{similarity}(fi, fj) = \cos(\theta) = \frac{vi \cdot vj}{\|vi\|_2 \|vj\|_2} = \frac{\sum_{k=1}^{n} vi(k) \times vj(k)}{\sqrt{\sum_{k=1}^{n} vi(k)^2} \times \sqrt{\sum_{k=1}^{n} vj(k)^2}} \quad \text{Equation 2}$$

In Equation 2, vi(k) and vj(k) denote a k-th element of a movement vector vi and a k-th element of a movement vector vj, respectively. $\|vi\|_2$ and $\|vj\|_2$ denote an example L2-norm of the movement vector vi and an example L2-norm of the movement vector vj, respectively, and indicate respective square roots of a square sum of all elements included in the movement vectors. Accordingly, the subject recognizing apparatus may determine whether the feature points fi and fj have similar movements by comparing a similarity between the feature points fi and fj. In response to the feature points fi and fj having determined similar movements, that is, in response to the calculated similarity between the feature points fi and fj not meeting, e.g., being less than, a preset similarity threshold value and thus corresponding to there being a predetermined sufficiently high similarity between the movements of feature points fi and fj, the subject recognizing apparatus may group the feature points fi and fj to one group. Alternatively, the subject recognizing apparatus may group the feature points fi and fj to separate groups if the calculated similarity meets, e.g., is equal to or greater than, the preset similarity threshold value and thus corresponding to there being a predetermined sufficiently low similarity between the movements of feature points fi and fj. The subject recognizing apparatus may generate such one or more groups by proceeding through such considerations/comparisons for all feature points in the target image 210.

FIG. 2 illustrates resultant groups 260, 270, 280, and 290 generated from the target image 210 using Equation 2, for example. Because feature points of identical or same subjects have similar movements in the target image 210 and the reference image 220, feature points of different subjects may be grouped to different groups. The subject recognizing apparatus may recognize the respective subjects for each of the groups 260, 270, 280, and 290. An image vocabulary tree may be used in a process in which the subject recognizing apparatus recognizes the subject for each group. For example, the image vocabulary tree may be generated by disposing source images of a plurality of objects including a subject in a feature space determined based on elements of feature point descriptors and then hierarchically clustering the source images disposed in the feature space.

Figure 3:
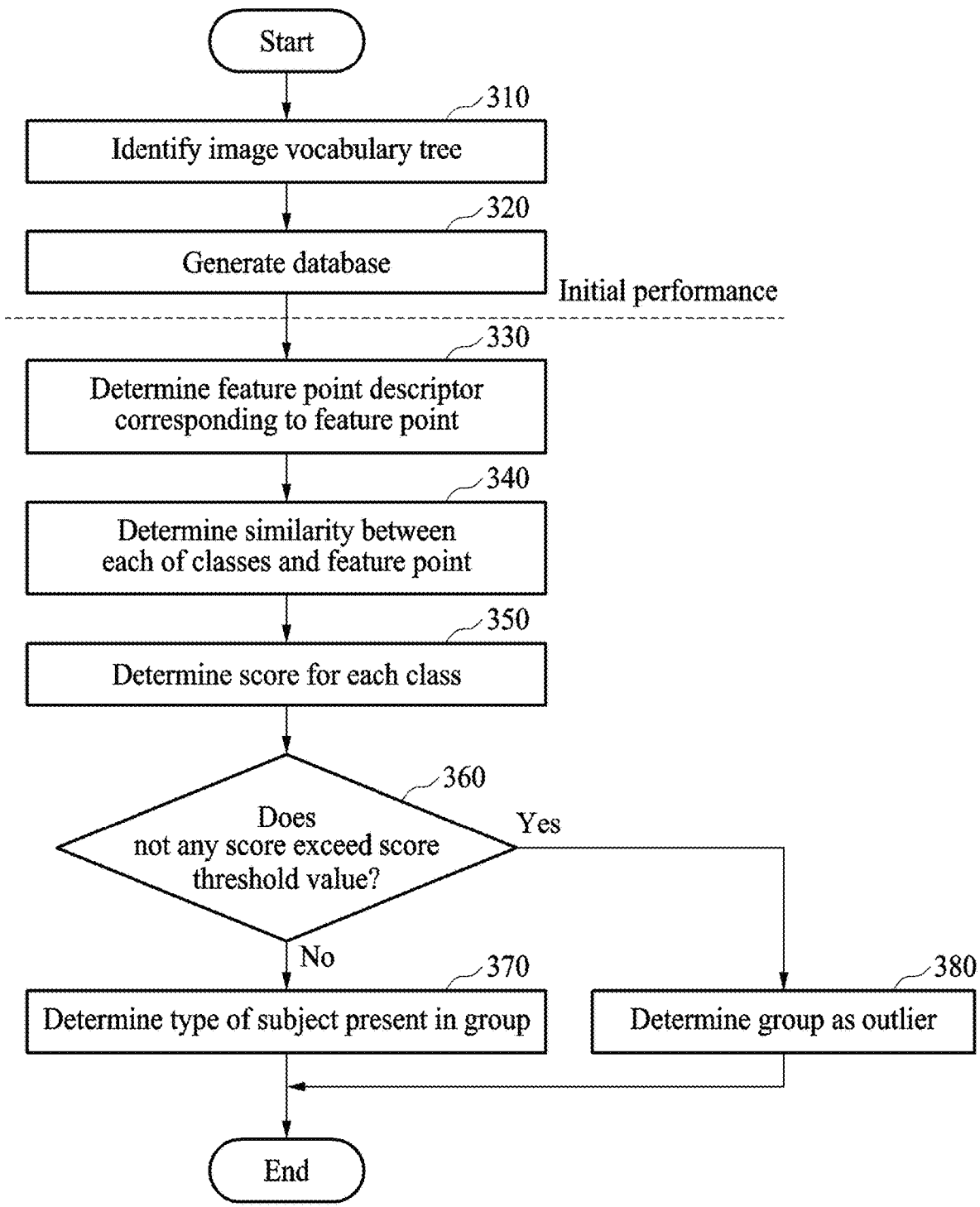
FIG. 3 is a flowchart illustrating an example of a subject recognizing method for determining a type of subject present in each of plural groups using a feature space divided based on an image vocabulary tree.

FIG. 3 is a flowchart illustrating an example of a subject recognizing method for determining a type of subject present in each of plural groups using a feature space divided based on an image vocabulary tree. Below, though the subject recognizing method of FIG. 3 is explained through references to a subject recognizing apparatus, which may correspond to any one or any combination of the respective subject recognizing apparatuses of FIGS. 1-2, FIGS. 4 through 10, and the subject recognizing apparatus 1110 of FIG. 11, examples are not limited thereto.

In operation 310, the example subject recognizing apparatus identifies a preset image vocabulary tree. The subject recognizing apparatus may load a data structure of the image vocabulary tree by identifying the image vocabulary tree. In more detail, the data structure of the image vocabulary tree may be stored in a memory of the subject recognizing apparatus, and one or more processors of the subject recognizing apparatus may load the identified image vocabulary tree and perform the subject recognizing based on the identified image vocabulary tree.

In operation 320, the subject recognizing apparatus generates a database by applying source images, for example, key frames of objects, including a plurality of objects including a subject to the data structure of the image vocabulary tree. The generated database may be generated by hierarchically quantizing the feature point descriptors corresponding to feature points of the source images from a root node to a leaf node of the image vocabulary tree.

For example, the subject recognizing apparatus may dispose the feature point descriptors determined from the feature points of the source images in the feature space, and cluster the disposed feature point descriptors using a K-average algorithm. Thus, feature points that are relatively close to each other in the feature space may be grouped to one cluster. The subject recognizing apparatus may hierarchically group the feature points in the feature space based on a branching factor and a number of levels. The branching factor and the number of levels may be defined in advance, input from a user, or heuristically determined. When the feature point descriptors, that is, the source images, are hierarchically clustered along the image vocabulary tree, clusters of source images corresponding to lowermost nodes of the image vocabulary tree are referred to as classes. Because the relatively close feature points in the feature space are clustered as one cluster, the source images may be clustered based on a similarity between objects included in the source images. Before a subject of a target image is recognized, for example, before the target image is received as in operation 110 of FIG. 1, the subject recognizing apparatus may perform operations corresponding to operations 310 and 320 for the database and the image vocabulary tree.

Figure 4:
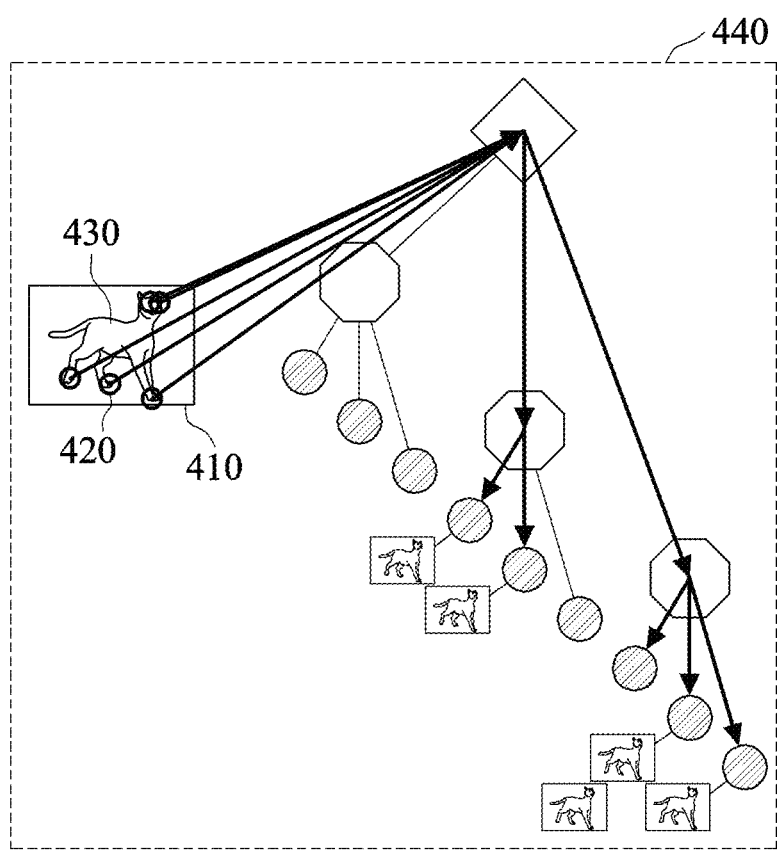
FIG. 4 illustrates an example of a subject recognizing method for applying a source image to a data structure of an image vocabulary tree.

As a further example, FIG. 4 illustrates an example of a subject recognizing method for applying a source image 410 to a data structure of an image vocabulary tree 440. Below, though the subject recognizing method of FIG. 4 is explained through references to a subject recognizing apparatus, which may correspond to any one or any combination of the respective subject recognizing apparatuses of FIGS. 1-3, FIGS. 5 through 10, and the subject recognizing apparatus 1110 of FIG. 11, examples are not limited thereto.

FIG. 4 illustrates a process of adding the example source image 410 to such a database by applying feature point descriptors corresponding to feature points of the source image 410 to a data structure of the example image vocabulary tree 440.

For example, the source image 410 corresponding to various objects including a subject may be provided, e.g., for the subject recognizing apparatus to identify a type of the subject when included in a target image. The subject recognizing apparatus may extract a feature point 420 associated with an object 430 included in the source image 410.

The subject recognizing apparatus may determine a feature point descriptor corresponding to the extracted feature point 420.

Referring to FIG. 4, the subject recognizing apparatus may hierarchically spread the determined feature point descriptor in the data structure of the image vocabulary tree 440 from a root node to a leaf node. For example, the subject recognizing apparatus may determine a similarity between the feature point descriptor and each node of the image vocabulary tree 440 based on a determined Hamming distance. The subject recognizing apparatus may map the feature point descriptor to a node having a determined greatest similarity. Further, the subject recognizing apparatus may add the source image 410 to the leaf node of the image vocabulary tree 440 based on a result of the mapping of the feature point descriptor to the node having the determined greatest similarity.

Referring back to FIG. 3, in operation 330, the subject recognizing apparatus determines a feature point descriptor corresponding to an extracted feature point of a target image. For example, the subject recognizing apparatus may perform an operation corresponding to operation 330 after groups of feature points are determined, for example, after an operation corresponding to operation 150 of FIG. 1 is performed. Operation 330 may also be performed after or include the subject recognizing apparatus loading the aforementioned data structure of the image vocabulary tree when performing the subject recognizing using the data structure and image vocabulary tree described with respect to operations 310 and 320 of FIG. 3 and operations described with respect to FIG. 4. The subject recognizing apparatus may determine a feature point descriptor of each of the feature points included in each of the groups. In response to the subject recognizing apparatus determining an ORB binary descriptor, as a non-limiting example, as the feature point descriptor corresponding to the feature point, the feature point descriptor may include a 256-bit binary value, as only an example. In an example, the format of the feature point descriptor determined from the feature point of the target image by the subject recognizing apparatus may be identical to that of a feature point descriptor determined from a feature point of a source image when the aforementioned example source images were clustered.

In operation 340, the subject recognizing apparatus determines the similarity between each of classes and the feature point corresponding to the feature point descriptor by inputting the feature point descriptor to the database. In more detail, the subject recognizing apparatus may compare, to a feature point descriptor corresponding to a feature point of the target image, a representative value (for example, feature point descriptor positioned on center of cluster) of a cluster generated by hierarchically dividing feature point descriptors of the source image in the feature space from the root node to the leaf node of the image vocabulary tree. An operation by which the subject recognizing apparatus compares the representative value of the cluster to the feature point descriptor may be hierarchically performed from the root node to the leaf node of the image vocabulary tree, for example.

That is, the feature point descriptor corresponding to the feature point of the target image may be hierarchically spread from the root node to the leaf node of the image vocabulary tree. The subject recognizing apparatus may determine a similarity between each of classes, that is, clusters corresponding to a lowermost node of the image vocabulary tree and the feature point corresponding to the feature point descriptor, based on a result of hierarchically spreading the feature point descriptor from the root node to the leaf node of the image vocabulary tree. $S_l(f_i)$ denotes a similarity between an i-th feature point of a predetermined group and an l-th class.

In operation 350, the subject recognizing apparatus determines, for each class, a score indicating a similarity between a group and a class by combining similarities between the class and the feature points included in the group. In more detail, a score indicating a similarity between an o-th group and the l-th class may be determined as expressed in the below Equation 3, for example.

$$l^{th}\text{Class Score} = \sum_{i=1}^{G_O} S_l(f_i) \quad \text{Equation 3}$$

In Equation 3, $G_O$ denotes a number of feature points included in the o-th group. That is, as a number of feature points similar to a predetermined class increases among feature points included in a group, a score of a group associated with the predetermined class may increase. The subject recognizing apparatus may calculate a similarity between a plurality of groups included in the target image to each of a plurality of classes based on Equation 3, for example.

In operation 360, the subject recognizing apparatus may verify whether any score among the scores determined for each class does not exceed a score threshold value by comparing the score determined from each class in the group to a preset score threshold value.

In response to at least one score being determined to exceed the score threshold value, the subject recognizing apparatus determines a type of the subject present in the group based on one or more classes corresponding to the at least one score that is determined to exceed the score threshold value in operation 370. In more detail, the subject recognizing apparatus may identify a greatest score among the scores that exceed the score threshold value from among the scores determined for each class in the group. The subject recognizing apparatus may determine the type of subject present in the group based on a class corresponding to the greatest score. As described above, classes generated by clustering source images may be generated for each type of object because the source images are clustered based on a similarity between objects included in the source images. Thus, the subject recognizing apparatus may determine an object corresponding to the class having the greatest score as the subject present in the group. The subject recognizing apparatus may determine the type of subject present in each group of the target image by performing an operation corresponding to operation 370 for each group.

In operation 380, the subject recognizing apparatus determines, as an outlier, a group whose determined score is determined to not exceed the score threshold value. The outlier may indicate a state in which no subject is present in a group or a type of subject present in a group is indeterminable. For example, group determined as an outlier may not be used or considered by the subject recognizing apparatus in the recognizing of a subject included in the target image.

Figure 5:
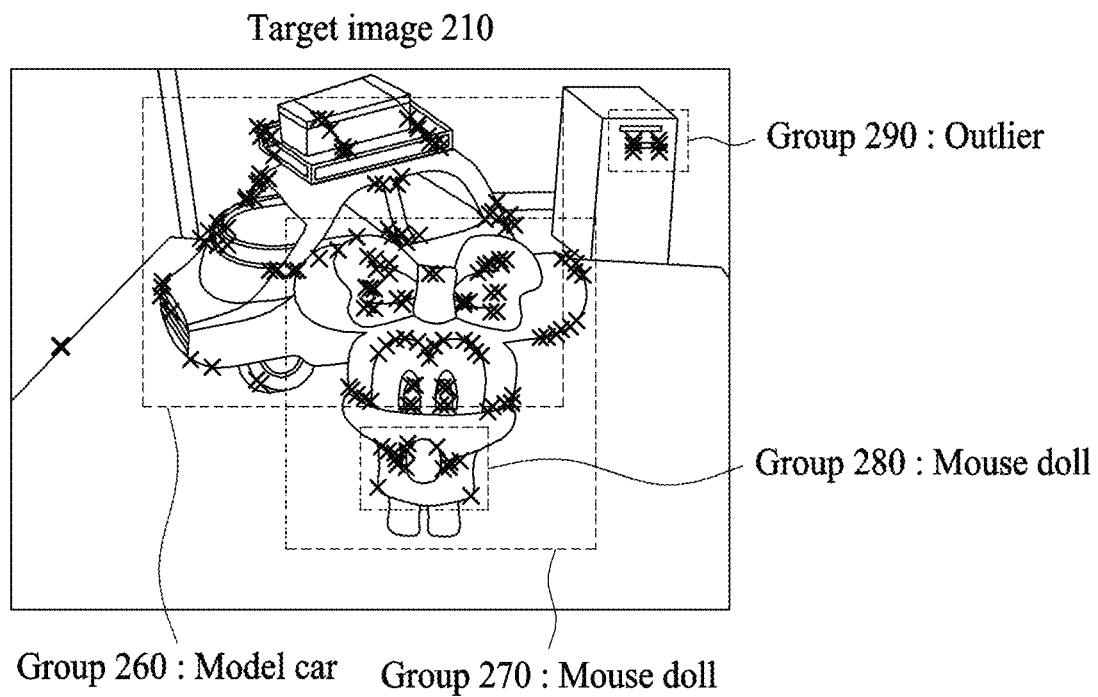
FIG. 5 illustrates an example of a subject recognizing method for determining a type of subject present in each of plural groups of a target image.

FIG. 5 illustrates an example of a subject recognizing method for determining a type of subject present in each of plural groups of a target image, such as the target image 210 of FIG. 2, as a non-limiting example. Below, though the subject recognizing method of FIG. 5 is explained through references to a subject recognizing apparatus, which may correspond to any one or any combination of the respective subject recognizing apparatuses of FIGS. 1-4, FIGS. 6 through 10, and the subject recognizing apparatus 1110 of FIG. 11, examples are not limited thereto.

FIG. 5 illustrates a result of a determining of a type of subject present in each of example groups 260, 270, 280, and 290, such as generated from the feature points in the example target image 210 of FIG. 2. Here, for explanatory purposes, references to related or corresponding groups illustrated in FIG. 5 will be made using the same reference numbers as the example groups of FIG. 2, e.g., with group 260 corresponding to the model car, groups 270 and 280 corresponding to the mouse doll, and group 290 corresponding to an outlier group. For example, the subject recognizing apparatus may determine the type of subject present in each of the groups 260, 270, 280, and 290 of FIG. 2 by performing operation 160 of FIG. 1 and/or determine the type of subject present in each of the groups 260, 270, 280, and 290 of FIG. 5 by performing operations described with reference to FIG. 3 on each of the example groups of FIG. 5.

In more detail, referring to FIG. 5, the subject recognizing apparatus inputs feature point descriptors of feature points of the group 260 of FIG. 5 to a database generated based on a data structure of an image vocabulary tree. The database includes the image vocabulary tree generated by clustering source images of various objects including a model car and a mouse doll included in the target image 210 in a feature space of the feature point descriptors. The subject recognizing apparatus may calculate a similarity for each class of the group 260 based on Equation 3, for example. The subject recognizing apparatus may determine that the model car is present in, or corresponds to, the group 260 of FIG. 5 based on a class having a greatest similarity (that is, class acquired by clustering source images of model car). Similarly, the subject recognizing apparatus may determine that a mouse doll is present in, or corresponds to, the groups 270 and 280 of FIG. 5.

Referring to FIG. 5, all determined class-based similarities of the group 290 of FIG. 5 may be less than a preset similarity threshold value. In this case, the subject recognizing apparatus may determine that the group 290 of FIG. 5 is an outlier, that is, the corresponding type of subject is indeterminable from the group 290. Thus, the subject recognizing apparatus may recognize the subject included in the target image 210 based on the groups 260, 270, and 280 of FIG. 5 excluding the group 290 of FIG. 5 in a process of recognizing the subject included in the target image 210.

Although the subject recognizing apparatus generates the groups 260, 270, 280, and 290 of FIG. 5 by grouping respective feature points having similar temporal movements, subjects in the target image 210 may not correspond to groups one to one. For example, referring to FIG. 5, the subject recognizing apparatus may separately generate the group 270 of FIG. 5 and the group 280 of FIG. 5 for the example single subject (mouse doll). Due to some groups not corresponding to the subjects in the target image 210 one to one, the subject recognizing apparatus may accurately recognize the subjects included in the target image 210, e.g., compared to typical technological approaches, by merging a plurality of groups generated from a single or same subject.

Figure 6:
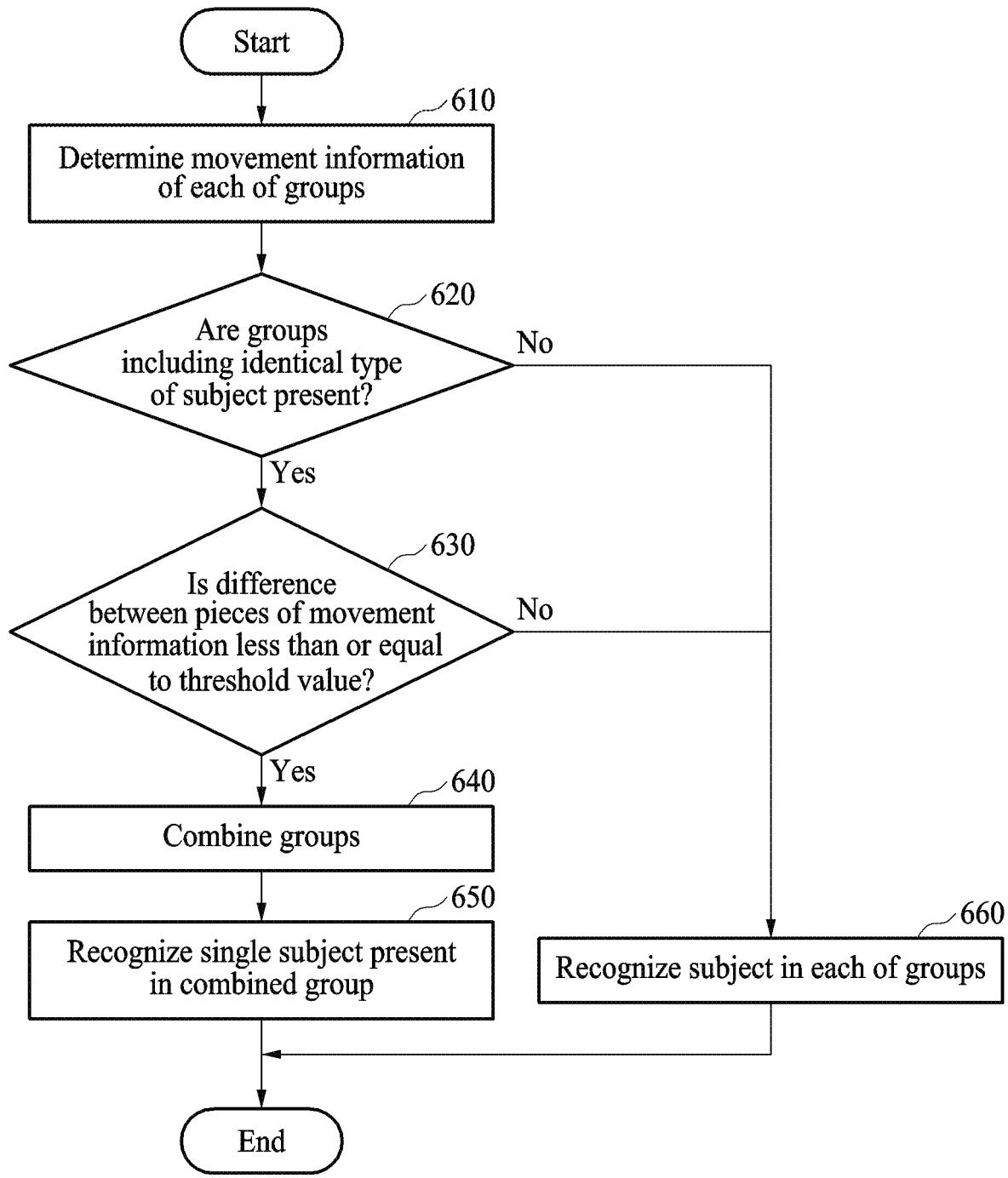
FIG. 6 is a flowchart illustrating an example of a subject recognizing method for searching for a plurality of groups generated from a single subject and merging the found groups.

FIG. 6 is a flowchart illustrating an example of a subject recognizing method for searching for a plurality of groups generated from a single subject and merging the found groups. Below, though the subject recognizing method of FIG. 6 is explained through references to a subject recognizing apparatus, which may correspond to any one or any combination of the respective subject recognizing apparatuses of FIGS. 1-5, FIGS. 7 through 10, and the subject recognizing apparatus 1110 of FIG. 11, examples are not limited thereto.

Before operations of FIG. 6 are performed, the example subject recognizing apparatus may determine movement information of feature points and detect a type of a subject present in each of groups of the feature points by performing operations described with reference to FIG. 1 and/or FIG. 3, for example.

In operation 610, the subject recognizing apparatus determines movement information of each of the groups based on the movement information of the feature points included in each of the groups. For example, the subject recognizing apparatus may determine a movement vector of a group by combining movement vectors of a plurality of feature points included in the group. The subject recognizing apparatus may combine the movement vectors of the feature points and then divide an element of the combined movement vector such that an average vector of the movement vectors of the respective feature points included in the group may be determined. The subject recognizing apparatus may determine the average vector of the movement vectors of the respective feature points included in the group as a movement vector of the group.

In operation 620, the subject recognizing apparatus verifies whether there are groups that include an identical type of subject, by comparing the types of subjects determined in the respective groups, because groups that include an identical type of subject may be possibly generated from a single or same subject, such as demonstrated with groups 270 and 280 of FIGS. 2 and 5.

In response to two or more groups being determined to include identical types of subject, the subject recognizing apparatus verifies whether a corresponding difference between pieces of movement information is less than or equal to a preset threshold value by comparing the pieces of movement information of the two or more groups in operation 630. In more detail, in response to an average vector of movement vectors of the respective feature points included in a group being determined as a movement vector of that group, the subject recognizing apparatus may subtract the movement vectors of each of the two or more groups and calculate the difference between the movement vectors of the two or more groups in a vector form. The subject recognizing apparatus may thus verify whether the difference between pieces of movement information is less than or equal to the preset threshold value by comparing a size of a vector indicating the difference between the movement vectors to the preset threshold value.

In response to the two or more groups including the identical type of subject being determined, the subject recognizing apparatus may combine groups thereof for which the difference between the pieces of movement information is less than or equal to the preset threshold value and in which the type of subject is identical in operation 640. That is, the subject recognizing apparatus may determine that the groups of which the difference between the pieces of movement information is less than or equal to the preset threshold value and in which the type of subject is identical are generated from a single or same subject. Thus, these groups including the identical type of subject and having similar temporal movements are combined as one group such that the subjects in the target image may correspond to the determined groups one to one. That is, with this combination, the number of the subjects included in the target image may be identical to the number of the groups.

In response to the difference between the pieces of movement information being greater than or equal to the preset threshold value, the subject recognizing apparatus may recognize or determine the presence of the single or same subject in the combined group in operation 650. That is, the subject recognizing apparatus may determine that the single subject is present in the combined group. As described above, compared to typical technological approaches, the subject recognizing apparatus may more accurately recognize the subject present in the target image because the subjects in the target image may correspond to the groups one to one. In more detail, the subject recognizing apparatus may accurately determine the type of subject of the target image and a region in which the subject is present, and thus examples may provide an example technological improvement over typical technological approaches.

In response to no groups being determined to include identical types of subjects or the difference between the pieces of movement information of the groups including the identical type of subject being greater than or equal to the preset threshold value, the subject recognizing apparatus may merely determine that the subject(s) of the target image based on results of the identifying of the type of subject in each of the groups, e.g., without performing the combining of the groups in operation 660. That is, the subject recognizing apparatus may determine that each of a plurality of groups are each respectively generated from a single subject, and determine that different subjects are present in the respective groups.

For example, even when the type of subject determined from each of plural groups is determined to be identical by the subject recognizing apparatus, the subject recognizing apparatus may still determine that different subjects are present even though a type of each of the plural groups is identical, in response to the determined difference between the pieces of movement information being determined to be greater than or equal to the preset threshold value. However, in response to a determination that no groups include identical types of subject being, the subject recognizing apparatus may determine that different subjects are present in the respective determined groups of the target image. Also, after one or more such different combination operations, if no further combinations are determined to be required the subject recognizing apparatus may continue with the identifying of the subjects of the target image based on the finally determined groupings of the target image.

Figure 7:
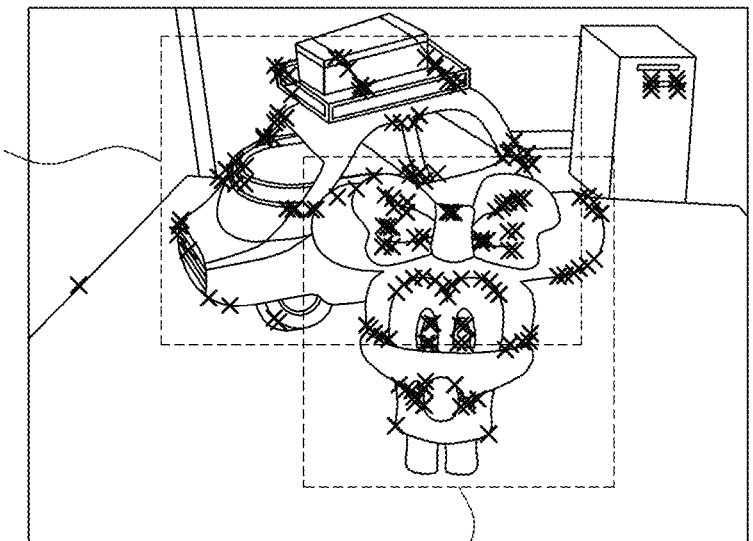
FIG. 7 illustrates an example of a subject recognizing method for recognizing a subject of a target image.

FIG. 7 illustrates an example of a subject recognizing method for recognizing a subject of a target image. Below, though the subject recognizing method of FIG. 7 is explained through references to a subject recognizing apparatus, which may correspond to any one or any combination of the respective subject recognizing apparatuses of FIGS. 1-6, FIGS. 8 through 10, and the subject recognizing apparatus 1110 of FIG. 11, examples are not limited thereto.

The example subject recognizing apparatus may recognize a subject of the target image 210 based on a type of the subject determined from each of plural groups. FIG. 7 illustrates a result where the subject recognizing apparatus represents regions of the target image 210, in which respective subjects are present, as bounding boxes 710 and 720.

As described above, the subject recognizing apparatus may generate multiple groups, such as the four groups 260, 270, 280, and 290 of FIGS. 2 and 5, from the target image 210, and determine respective types of the subject present in each of the groups, such as described with reference to FIG. 5. The subject recognizing apparatus may recognize the subjects present in the target image 210 based on the determined types of the subjects present in the groups. For example, the subject recognizing apparatus may represent a region in which a model car is present as the bounding box 710 because it is determined that the model car is present in the example group 260.

Further, the subject recognizing apparatus may perform the operation described with reference to FIG. 6 and identify groups in which types of subjects are identical and where similarly moving subjects are included. For example, the subject recognizing apparatus may determine that the example groups 270 and 280 include identical types of subjects moving similarly, and the subject recognizing apparatus may determine that a single or same subject (mouse doll) is present in both of the groups 270 and 280 and combine the group 270 and the group 280 of FIG. 5, for example. Referring to FIG. 7, the subject recognizing apparatus may represent a resulting region in which the example mouse doll is present as the bounding box 720, which may also represent a position of the subject of the combined group. For example, the bounding box 720 may be determined based on the performed combination of the groups 270 and 280 of FIG. 5, such as described with reference to FIG. 6.

When the subject recognizing apparatus recognizes the subjects of the target image 210, a group determined as an outlier may be excluded. For example, because the group 290 of FIGS. 2 and 5 are determined as outliers, the subject recognizing apparatus may not use the group 290 to recognize the subjects of target image 210.

Figure 8:
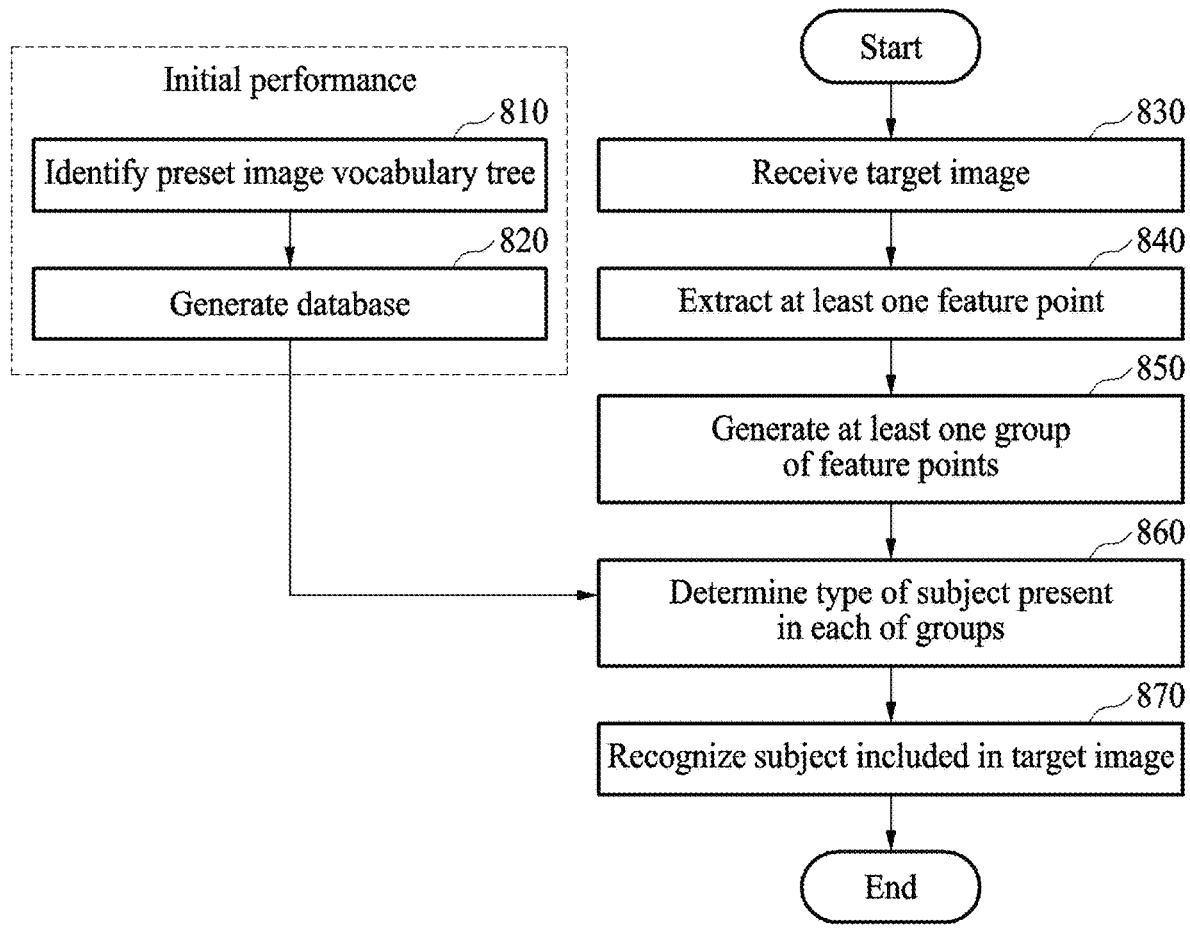
FIG. 8 is a flowchart illustrating an example of a subject recognizing method for recognizing a subject of a target image based on movement of a feature point.

FIG. 8 is a flowchart illustrating an example of a subject recognizing method for recognizing a subject of a target image based on movement of a feature point. Below, though the subject recognizing method of FIG. 8 is explained through references to a subject recognizing apparatus, which may correspond to any one or any combination of the respective subject recognizing apparatuses of FIGS. 1-7, FIGS. 9 through 10, and the subject recognizing apparatus 1110 of FIG. 11, examples are not limited thereto.

In operation 810, the example subject recognizing apparatus identifies a preset image vocabulary tree. The subject recognizing apparatus may load a data structure of the identified image vocabulary tree to a memory. In more detail, the data structure of the image vocabulary tree may be stored in a memory of the subject recognizing apparatus, and one or more processors of the subject recognizing apparatus may load the identified image vocabulary tree and perform the subject recognizing based on the identified image vocabulary tree.

In operation 820, the subject recognizing apparatus generates a database used to determine a type of a subject by spreading source images of a plurality of objects including the subject based on the data structure of the image vocabulary tree. The subject recognizing apparatus may apply a feature point descriptor corresponding to the feature points of the source images to the image vocabulary tree, such as through operations described above with reference to FIGS. 3 and 4. In an example, before a subject of a target image is recognized, for example, before the target image is received as in operation 110 of FIG. 1 or operation 830, the subject recognizing apparatus may perform operations corresponding to operations 810 and 820 for the image vocabulary tree.

In operation 830, the subject recognizing apparatus receives the target image from a camera. The received target image may thus capture the subject through operation of the camera. The camera may consecutively capture the subject at a preset time interval. For example, the camera may include two image sensors spaced apart from each other based on a predetermined parallax, simultaneously capture the subject using the two image sensors which may respectively generate the target image and a parallax image corresponding to the target image. The camera may be a stereo or multi-view camera, as only example, where two or more of such image sensors are separated by predefined distances. The camera may include a depth sensor, and the camera or the subject recognizing apparatus may generate a depth map representing, for each pixel, a distance between the camera and the subject present in a pixel of the target image. The camera may alternatively generate a disparity mapping between the example two image sensors. The subject recognizing apparatus may receive the target image in addition to any one and any combination of any two or more of the depth map, the disparity mapping, the parallax image, and a reference image corresponding to the target image. In another example, the camera may be included in the subject recognizing apparatus.

In operation 840, the subject recognizing apparatus extracts one or more feature points from the target image. The subject recognizing apparatus may identify a subject more rapidly than when all pixels of the target image are used to recognize the subject, because the extracted feature points are used to recognize the subject of the target image rather than information of all pixels of the target image. Further, in an example, because the subject recognizing apparatus may extract only information required for recognizing the subject from such feature points, an inappropriate influence on recognition of the subject may be prevented compared to when unnecessary information is extracted from/for all pixels, and thus subject recognition may be performed by the subject recognizing apparatus using less information than previous technological approaches.

In operation 850, the subject recognizing apparatus generates one or more groups of feature points by grouping similarly moving feature points based on a temporal movement and/or a spatial movement of each of the feature points. The temporal movement of a feature point may be acquired by comparing the target image to a reference image captured before or after the target image is captured. The spatial movement of a feature point may be determined based on the parallax image, a disparity mapping, or the depth map corresponding to the target image. For example, the subject recognizing apparatus may extract relative depth information of the feature points based on an ORB Simultaneous Localization And Mapping (ORB-SLAM) method, as a non-limiting example, and generate groups of the feature points based on the extracted relative depth information.

Because the feature points are grouped based on the temporal movement and/or the spatial movement, the feature points of each of a plurality of subjects may be respectively grouped to different groups although the corresponding subjects overlap each other in the target image. In the grouping, the subject recognizing apparatus may determine the number of the groups using a density peak value or a K-average algorithm with respect to movement information indicating the temporal movement and/or the spatial movement of each of the feature points, and generate one or more groups by grouping the feature points based on the movement information.

In operation 860, the subject recognizing apparatus determines the type of subject present in each of the groups. The subject recognizing apparatus may identify, for each group, a class of the image vocabulary tree which is determined most similar to the feature points included in the corresponding group. For example, the subject recognizing apparatus may determine the similarity between each of the groups and classes using the above Equation 3. Further, the subject recognizing apparatus may identify a group which is determined to not be similar to any class, and determine that identified group to be an outlier group.

In operation 870, the subject recognizing apparatus recognizes the subject included in the target image based on the respective types of subject determined for each of the groups. The subject recognizing apparatus may verify whether the groups correspond to the subjects in the target image one to one. In response to the groups not corresponding to the subjects in the target image one to one, the subject recognizing apparatus may respectively combine one or more groups generated from/for single or same subjects, e.g., until the groups correspond to the subjects in the target image one to one. In such a case, the subject recognizing apparatus may determine a position of a subject and a type of the subject included in the target image based on a result of the combining of the groups, and output the determined position of the subject by representing the position as a bounding box, for example.

Figure 9:
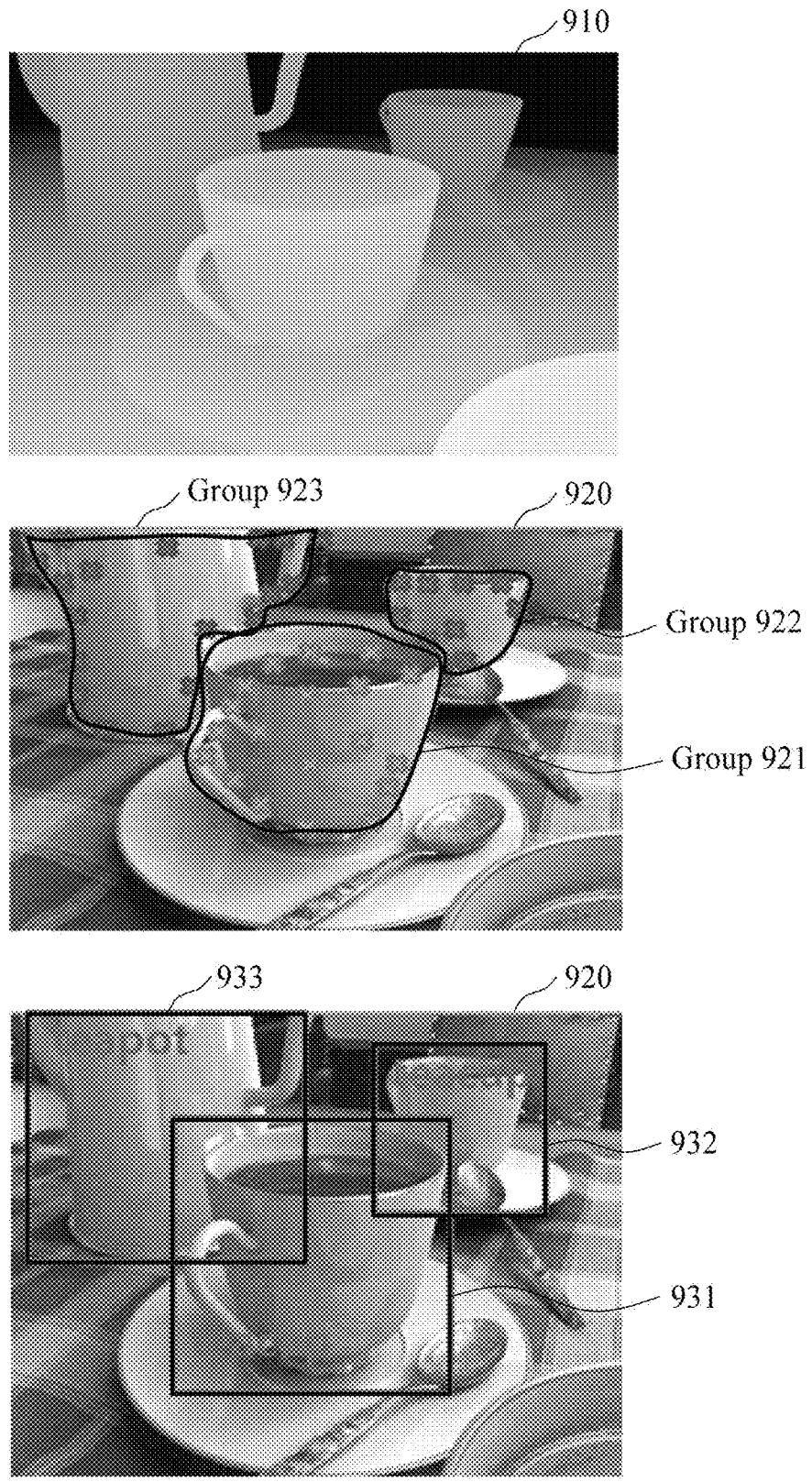
FIG. 9 illustrates an example of a subject recognizing method for recognizing a subject of a target image based on movement.

FIG. 9 illustrates an example of a subject recognizing method for recognizing a subject of a target image 920 based on movement. Below, though the subject recognizing method of FIG. 9 is explained through references to a subject recognizing apparatus, which may correspond to any one or any combination of the respective subject recognizing apparatuses of FIGS. 1-8, FIG. 10, and the subject recognizing apparatus 1110 of FIG. 11, examples are not limited thereto.

FIG. 9 illustrates a pixel-based depth included in a depth map 910 in grayscale, e.g., where greater intensities represent closer depths and lower intensities represent farther depths. Here, the example subject recognizing apparatus receives the depth map 910 corresponding to the target image 920. The subject recognizing apparatus may generate groups 921, 922, and 923 by grouping feature points having determined similar depths. The subject recognizing apparatus may identify respective types of the subjects present in each of the groups 921, 922, and 923. For example, the subject recognizing apparatus may identify that respective subjects present in each of the groups 921 and 922 are tea cup types, and may identify that the subject present in the group 923 is a teapot type.

The subject recognizing apparatus may determine that the subjects in each of groups 921 and 922 are identical. Because the subjects present in the group 921 and the group 922 are determined identical, the subject recognizing apparatus may verify whether the group 921 and the group 922 are generated from a single or same subject, that is, the same tea cup, based on a movement of respective feature points of each of groups 921 and 922. The subject recognizing apparatus may also determine an average depth of feature points included in the group 921 and an average depth of feature points included in the group 922 using the depth map 910.

The subject recognizing apparatus may determine whether to combine the group 921 and the group 922 by comparing the average depth determined from the group 921 to the average depth determined from the group 922. In more detail, the subject recognizing apparatus may combine the group 921 and the group 922 in response to a determined difference between the average depth determined from the group 921 and the average depth determined from the group 922 being less than or equal to a preset threshold value. However, as illustrated in FIG. 9, the group 921 and the group 922 are generated from different tea cups, and thus the difference between the average depth determined from the group 921 and the average depth determined from the group 922 may accordingly be greater than or equal to the preset threshold value. Otherwise, if the groups 921 and 922 were generated from the same tea cups, then the difference between the average depth determined from the group 921 and the average depth determined from the group 922 would be small, and thus not greater or equal to the example preset threshold value. Thus, the subject recognizing apparatus may determine to not combine the group 921 and the group 922, and determine that different tea cups are present in the different groups 921 and 922.

Lastly, the subject recognizing apparatus may recognize the subject included in the target image 920 based on such determinations of whether to combine groups. Referring to FIG. 9, the subject recognizing apparatus may output a bounding box 931 representing the tea cup present in the group 921, a bounding box 932 representing the tea cup present in the group 922, and a bounding box 933 representing the teapot present in the group 923. Thus, the subject recognizing apparatus may simultaneously output respective types of subjects and positions of the subjects present in the target image 920.

FIG. 10 is a flowchart illustrating an example of a subject recognizing method for recognizing a subject of a target image 1020 based on movement. Below, though the subject recognizing method of FIG. 10 is explained through references to a subject recognizing apparatus, which may correspond to any one or any combination of the respective subject recognizing apparatuses of FIGS. 1-9 and the subject recognizing apparatus 1110 of FIG. 11, examples are not limited thereto.

FIG. 10 illustrates a pixel-based depth included in a depth map 1010 in grayscale. Here, the example subject recognizing apparatus receives the depth map 1010 corresponding to the target image 1020. The subject recognizing apparatus may generate groups 1021, 1022, and 1023 by grouping respective feature points having determined similar depths. The subject recognizing apparatus may identify respective types of the subjects present in each of the groups 1021, 1022, and 1023. For example, the subject recognizing apparatus may identify that each of the groups 1021, 1022, and 1023 include a subject of a motorbike type, i.e., the subject determined present in each of the groups 1021, 1022, and 1023 is a motorbike. Thus, in a determination of whether any of the groups 1021, 1022, and 1023 include an identical subject, the subject recognizing apparatus may determine that the subject present in each of the groups 1021, 1022, and 1023 is identical.

Because the subject present in each of the groups 1021, 1022, and 1023 is identical, the subject recognizing apparatus may verify whether any of the groups 1021, 1022, and 1023 are generated from a single or same subject, that is, the same motorbike, e.g., based on a determined movement of the respective feature points of each of the groups 1021, 1022, and 1023. Based on the determination that each of the groups 1021, 1022, and 1023 are generated by the single subject or present identical subjects, for example, the subject recognizing apparatus may determine an average depth of the respective feature points for each of the groups 1021, 1022, and 1023 using the depth map 1010.

Based on the determination that each of the groups 1021, 1022, and 1023 are generated by the single subject, for example, the subject recognizing apparatus may determine whether to combine the groups 1021, 1022, and 1023 by comparing each of the average depths determined from each of the groups 1021, 1022, and 1023. In more detail, the subject recognizing apparatus may combine the group 1021 and the group 1022 in response to a difference between the average depth determined from the group 1021 and the average depth determined from the group 1022 being less than or equal to a preset threshold value, combine the group 1022 and the group 1023 in response to a difference between the average depth determined from the group 1022 and the average depth determined from the group 1023 being less than or equal to the example preset threshold value, combine the group 1021 and the group 1023 in response to a difference between the average depth determined from the group 1021 and the average depth determined from the group 1023 being less than or equal to the example preset threshold value, or the groups 1021, 1022, and 1023 may be combined in response to a difference between all respective average depths determined for each of the groups 1021, 1022, and 1023 being less than or equal to the example preset threshold value.

Thus, considering the example where the subject recognizing apparatus combines the group 1021 and the group 1022 in response to the difference between the average depth determined from the group 1021 and the average depth determined from the group 1022 being less than or equal to the preset threshold value, as the group 1021 and the group 1022 are generated from the illustrated same or identical motorbike, the difference between the average depth determined from the group 1021 and the average depth determined from the group 1022 will be less than or equal to the preset threshold value. Alternatively, if group 1021 and group 1022 were generated from different motorbikes, the difference would have been greater than the present threshold value. Herein, such preset threshold values may be predetermined based on predetermined accuracy requirements to accurately differentiate between the same/identical or different subjects, e.g., respectively based on such determined average depths or based on the aforementioned determined temporal movement considerations. Thus, in this example of FIG. 10, the subject recognizing apparatus may combine the group 1021 and the group 1022. Thereafter, the subject recognizing apparatus may combine the group resulting from the combination of the group 1021 and group 1022 with group 1023 by comparing similar aspects of the group 1023 to the combined aspects of the group resulting from the combination of the groups 1021 and 1022.

Lastly, the subject recognizing apparatus may recognize the subject included in the target image 1020 based on a result of all combining of groups. Referring to FIG. 10, for example, the groups 1021, 1022, and 1023 have all been combined, with the final combined single group being present in the target image 1020. The subject recognizing apparatus may thus output a bounding box 1031 representing the motorbike present in the final combined group. Thus, based on this combination, the subject recognizing apparatus may simultaneously output a type of subject and the position of subject present in a target image.

Figure 11:
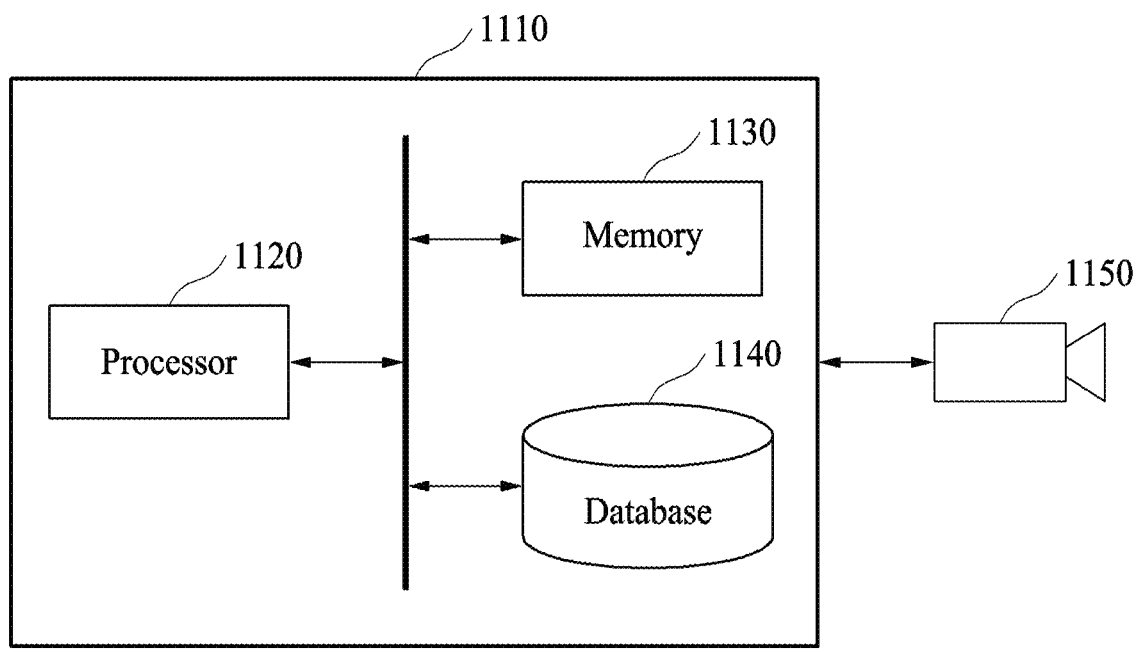
FIG. 11 illustrates an example of a subject recognizing apparatus.

FIG. 11 illustrates an example of a subject recognizing apparatus 1110. The subject recognizing apparatus 1110 is connected to a camera 1150 and receives an image from the camera 1150, the image may include a subject for identification through a subject recognizing method of the subject recognizing apparatus 1110. The subject recognizing apparatus 1110 may select any of the received images to be a target image, such as based on a selection of the target image at a select interval, as a non-limiting example, from among multiple images received from the camera 1150. The selection of the target image may be based on the example interval or alternatively based on a determination that the corresponding image at least includes feature points that may represent a subject, as non-limiting examples. In addition, though FIG. 11 illustrates a subject recognizing system that includes the subject recognizing apparatus 1110 and the camera 1150, the camera 1150 may be included in the subject recognizing apparatus 1110. The camera 1150 may further include one or more image and/or depth sensors and/or be representative of one or more cameras and/or depth sensors. Still further, any of the one or more image and/or depth sensors may be included in the subject recognizing apparatus 1110 and other of the one or more image and/or depth sensors may be exterior to the subject recognizing apparatus 1110 in the subject recognition system and in communication with the subject recognizing apparatus 1110, e.g., through wireless, wired, or IP or cloud, as only non-limiting examples, based communication schemes and communication hardware of the subject recognizing apparatus 1110. The subject recognizing apparatus 1110 includes a non-transitory memory 1130, e.g., configured to store the received target image and/or instructions configured to control the processor 1120 to implement one or more or any combination or all operations described herein. Also, though the memory 1130 and the processor 1120 may be referred to in the singular, it should be understood that the same also refers to examples where the memory 1130 represents one or more memories 1130 and/or the processor 1120 represents one or more processors 1120. As noted, the processor 1120 may be configured to recognize a subject that may be present in the target image, and configured to implement any one, any combination, or all of the subject recognizing methods or operations described above with respect to FIGS. 1-10, as non-limiting examples.

The subject recognizing apparatus 1110 may identify the subject present in the target image based on detection of feature points and determination or estimation of respective movements of one or more of the feature points. As an example, temporal and/or spatial movements of a feature point or collection of feature points may be respectively determined or estimated by the subject recognizing apparatus 1110. As non-limiting examples, the temporal movement of a feature point may be determined based on a relationship between the target image and a reference image captured before or after a point in time at which the target image is captured, and the spatial movement of a feature point may be determined based on an example parallax image, disparity mapping, and/or depth mapping corresponding to the target image. For example, the depth mapping may be implemented through a depth map or depth image generated by the camera 1150 or the subject recognizing apparatus 1110 corresponding to the target image, for example.

The subject recognizing apparatus 1110 may generate a group of feature points by grouping detected feature points having determined similar temporal movements and/or determined similar spatial movements, and determine a type of the subject present or reflected in the group of detected feature points. The subject recognizing apparatus 1110 may use an image vocabulary tree, e.g., previously generated by clustering source images of various objects including the subject, to determine the type of subject present in the group such that the subject recognizing apparatus 1110 may determine the type of subject present in the group in real-time, for example. To determine the type of subject present in the group, the subject recognizing apparatus 1110 may include a database 1140 in which a result of the clustering of the source images of objects including the subject may be stored based on the image vocabulary tree. As an alternative, the database 1140 may be separate from the subject recognizing apparatus 1110 and in hardware communication with the subject recognizing apparatus 1110, or a database 1140 included in the subject recognizing apparatus 1110 and another database 1140 exterior of the subject recognizing apparatus 1110 may be provided in the subject recognizing system of FIG. 11.

Further, in response to a determination that a plurality of such groups have been generated from a single or same subject, the subject recognizing apparatus 1110 may identify the groups generated from the single or same subject and combine the identified groups. Thus, with the combination of the identified groups, the subject recognizing apparatus 1110 may generate a one to one relationship between distinct subjects of the target image and separate groupings of feature points. The subject recognizing apparatus 1110 may recognize the subjects of the target image based on a result of combining the identified groups. Thus, the subject recognizing apparatus 1110 may recognize the subjects present in the target image more accurately, e.g., compared to typical technological approaches.

Each of the databases, cameras, images sensors, depth sensors, communication hardware, subject recognizing apparatuses, including the subject recognizing apparatus 1110, and the processor 1120, memory 1130, database 1140, and camera 1150, as only examples, discussed with reference to FIGS. 1-11 and other apparatuses, units, modules, devices, and other components described herein and that perform the operations described in this application are implemented by hardware components configured to perform the operations described in this application. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented subject recognizing method, the method comprising:
   extracting feature points from a target image being received in addition to any one and any combination of a depth map and a disparity mapping associated with the target image;
   respectively measuring movement information of each of a plurality of the extracted feature points, wherein the measured movement information is based on coordinate position movement of each of the plurality of the extracted feature points;
   selectively grouping the extracted feature points into one or more groups based on the respectively measured movement information;
   determining a type of subject present in at least one group of the one or more groups based on at least a portion of the subject present in the at least one group; and
   recognizing a subject included in the target image based on the determined type of subject.

2. The method of claim 1, wherein the respective measuring of the movement information includes measuring a temporal movement or a spatial movement of each of the plurality of the extracted feature points.

3. The method of claim 1, wherein the recognizing of the subject included in the target image is based on a non-occluded portion of the subject, without consideration of an occluded portion of the subject not present in the target image, based on the determined type of subject.

4. The method of claim 1, wherein the determining the type of the subject present in the at least one group of the one or more groups includes determining a feature point descriptor for a feature point, of the plurality of the extracted feature points, included in the one group and hierarchically spreading the feature point descriptor from a root node to a leaf node of an image vocabulary tree to determine a most similar class of plural classes of the image vocabulary tree, the most similar class being indicative of a corresponding type of subject present in the one group.

5. The method of claim 1, wherein the determining of the type of the subject present in the at least one group of the one or more groups includes determining respective types of subjects in each of two or more groups, including comparing each of the two or more groups to classes in which source images of objects including the subject are preclassified, and
wherein the recognizing of the subject includes determining whether any of the two or more groups include an identical type among the determined respective types of subjects, and combining select groups in which the identical type is determined based on corresponding measured movement information of the respectively measured movement information.

6. The method of claim 5, wherein the classes are preclassified in an image vocabulary database structure in a hierarchical classification of the source images of the objects in a feature space determined based on elements of feature point descriptors indicating features of pixels associated with feature points in the source images.

7. The method of claim 6, further comprising performing the preclassifying by performing the hierarchical classifying of the source images, with the image vocabulary database structure being an image vocabulary tree.

8. The method of claim 5, further comprising:
extracting, from the one or more groups, a group in which a corresponding type of subject is indeterminable.

9. The method of claim 5, wherein the combining comprises selectively combining the select groups, the selective combining being dependent on a determination, based on the corresponding measured movement information, of which of a single subject and different subjects the select groups correspond to.

10. The method of claim 9, wherein the combining further comprises:
calculating the corresponding movement information by calculating movement information of each of the select groups by respectively combining pieces of movement information of feature points for each of the select groups; and
the determination of which of the single subject and the different subjects the select groups correspond to being based on results of comparing the respectively combined pieces of the movement information.

11. The method of claim 1, wherein the respective measuring of the movement information of each of the plurality of the extracted feature points comprises determining temporal movement information indicating a respective temporal movement of each of the plurality of extracted feature points based on a reference image captured before or after a point in time at which the target image is captured.

12. The method of claim 1, wherein the respective measuring of the movement information of each of the plurality of the extracted feature points comprises:
determining spatial movement information indicating a respective spatial movement of each of the plurality of the extracted feature points based on depth information indicating a determined depth for each of the plurality of the extracted feature points from a camera based on comparisons of the target image and a parallax image corresponding to the target image and captured at a same time as the target image by the camera.

13. The method of claim 12, wherein the camera is a stereo camera including at least two image sensors separated by a preset distance, at least one of the two image sensors capturing the target image and the two image sensors being used to generate the parallax image.

14. A non-transitory computer readable medium storing instructions that, when executed by a processor, cause the processor to implement the method of claim 1.

15. A processor-implemented subject recognizing method, the method comprising:
extracting feature points from a target image being received in addition to any one and any combination of a depth map and a disparity mapping associated with the target image;
determining coordinate position movement information of the extracted feature points;
grouping the extracted feature points to generate plural groups of the extracted feature points, based on the determined coordinate position movement information of the extracted feature points;
determining respective types of subjects included in each of the plural groups, including determining whether two or more groups of the plural groups that have determined identical types of subject include at least respective portions of a same subject; and
recognizing a subject included in the target image based on the determined respective types of subjects.

16. The method of claim 15, wherein the generating of the plural groups comprises generating the plural groups based on respectively determined similarities between the extracted feature points, the respective determination of the similarities being determined by comparing respective coordinates of the extracted feature points and the determined coordinate position movement information of the extracted feature points, and
wherein the determining of the coordinate position movement information of the extracted feature points comprises comparing the target image to a reference image captured before the target image is captured.

17. The method of claim 15, wherein the determining of the respective types of subjects comprises determining a type of subject present in each of the plural groups by comparing each of the plural groups to classes in which source images of objects are preclassified in hierarchical classification of the source images of the objects in a feature space determined based on elements of feature point descriptors indicating features of pixels associated with feature points in the source images.

18. The method of claim 17, further comprising:
extracting, from the plural groups, a group in which a corresponding type of subject is indeterminable.

19. The method of claim 15, wherein the determining of the respective types of the subjects included in each of the plural groups comprises:
determining respective movement information indicating movements of each of the plural groups between the target image and a reference image captured before the target image is captured; and
determining whether the two or more groups of the plural groups have the identical types of the subject by determining whether the two or more groups include different portions of a same subject dependent on a difference between pieces of corresponding movement information, of the determined respective movement information, of the two or more groups being less than or equal to a preset threshold value.

20. The method of claim 19, further comprising:
combining the two or more groups in response to the determining of whether the two or more groups include the different portions of the same subject determining that the two or more groups include the different portions of the same subject.

21. A non-transitory computer readable medium storing instructions that, when executed by a processor, cause the processor to implement the method of claim 15.

22. A subject recognizing apparatus, comprising:
a processor configured to:
extract feature points from a target image being received in addition to any one and any combination of a depth map and a disparity mapping associated with the target image;
respectively measure movement information of each of a plurality of the extracted feature points based on coordinate position movement of each of the plurality of the extracted feature points;
selectively group the extracted feature points into one or more groups based on the respectively measured movement information;
determine a type of subject present in at least one group of the one or more groups based on at least a portion of the subject present in the at least one group; and
recognize a subject included in the target image based on the determined type of subject.

23. The subject recognizing apparatus of claim 22, further comprising a memory configured to store the target image received from a camera.

24. The subject recognizing apparatus of claim 22, further comprising a non-transitory memory storing instructions that, when executed by the processor, cause the processor to implement the extracting of the feature points, the respective measuring of the movement information of each of the plurality of the extracted feature points, the selective grouping of the extracted feature points into one or more groups, the determining of the type of the subject present in the at least one group of the one or more groups, and the recognizing of the subject included in the target image.

25. The subject recognizing apparatus of claim 22, wherein, to perform the determining of the type of the subject present in the at least one group of the one or more groups, the processor is further configured to:
determine a feature point descriptor for a feature point, of the plurality of the extracted feature points, included in the one group, and
hierarchically spread the feature point descriptor from a root node to a leaf node of an image vocabulary tree to determine a most similar class of plural classes of the image vocabulary tree, the most similar class being indicative of a corresponding type of subject present in the one group.

26. The subject recognizing apparatus of claim 22, wherein, to perform the determining of the type of subject present in the at least one group, the processor is further configured to determine respective types of subjects included in each of two or more groups of the one or more groups, and
wherein, to perform the recognizing of the subject, the processor is further configured to:
determine whether any of the two or more groups include an identical type among the determined respective types of subjects, and
selectively combine select groups in which the identical type is determined based on corresponding measured movement information of the respectively measured movement information.

27. The subject recognizing apparatus of claim 26, wherein, to perform the selective combining, the processor is further configured to selectively combine the select groups dependent on a determination, based on the corresponding measured movement information, of which of a single subject and different subjects the select groups correspond to.

28. The subject recognizing apparatus of claim 27, wherein, to perform the determination of which of the single subject and the different subjects the select groups correspond to, the processor is further configured to calculate the corresponding movement information by calculating movement information of each of the select groups, and perform the determination of which of the single subject and the different subjects the select groups correspond to based on results of a comparing of a difference between pieces of the calculated movement information of each of the select groups to a preset threshold value.

29. The subject recognizing apparatus of claim 22, further comprising:
a source image database configured to store source images of objects,
wherein the processor is further configured to generate classes generated by hierarchically classifying the source images in a feature space determined based on elements of the feature points, and
wherein, to determine the type of the subject present in the at least one group, the processor is further configured to determine respective types of subject present in each of the one or more groups based on a class matched to each of the one or more groups among the generated classes.

30. The subject recognizing apparatus of claim 29, wherein the processor is further configured to extract, from the one or more groups, a group in which a corresponding type of subject is indeterminable because the stored source images of objects, used to generate the classes, do not include the subject.

31. The subject recognizing apparatus of claim 22, further comprising a camera configured to capture the target image.

* * * * *